(12) United States Patent
Lee

(10) Patent No.: US 11,148,767 B2
(45) Date of Patent: Oct. 19, 2021

(54) FLOATING PHOTOVOLTAIC SYSTEM

(71) Applicant: SCOTRA CORPORATION, Pyeongtaek-si (KR)

(72) Inventor: Jongmok Lee, Pyeongtaek-si (KR)

(73) Assignee: SCOTRA CORPORATION, Pyeongtaek-si (KR)

(*) Notice: Subject to any disclaimer, the term of this patent is extended or adjusted under 35 U.S.C. 154(b) by 0 days.

(21) Appl. No.: 16/762,342

(22) PCT Filed: Apr. 18, 2018

(86) PCT No.: PCT/KR2018/004493
§ 371 (c)(1),
(2) Date: May 7, 2020

(87) PCT Pub. No.: WO2019/093603
PCT Pub. Date: May 16, 2019

(65) Prior Publication Data
US 2021/0179239 A1    Jun. 17, 2021

(30) Foreign Application Priority Data

Nov. 10, 2017 (KR) .......................... 10-2017-0149611
Nov. 10, 2017 (KR) .......................... 10-2017-0149624

(51) Int. Cl.
| | | |
|---|---|---|
| *B63B 35/44* | (2006.01) | |
| *H02S 10/40* | (2014.01) | |
| *H02S 20/30* | (2014.01) | |
| *H02S 40/36* | (2014.01) | |

(52) U.S. Cl.
CPC .............. *B63B 35/44* (2013.01); *H02S 10/40* (2014.12); *H02S 20/30* (2014.12); *H02S 40/36* (2014.12); *B63B 2035/4453* (2013.01)

(58) Field of Classification Search
CPC ...................................................... B63B 35/44
See application file for complete search history.

(56) References Cited

U.S. PATENT DOCUMENTS

| | | | | |
|---|---|---|---|---|
| 2018/0067003 A1* | 3/2018 | Michiwaki | ................ | G01L 1/22 |
| 2019/0265015 A1* | 8/2019 | Michiwaki | ................ | G01L 1/22 |

FOREIGN PATENT DOCUMENTS

| | | | | |
|---|---|---|---|---|
| EP | 3715746 A1 * | 9/2020 | ............. | F24S 25/16 |
| JP | H11-157480 A | 6/1999 | | |
| JP | 2001-303531 A | 10/2001 | | |
| KR | 10-0870390 B1 | 11/2008 | | |

(Continued)

OTHER PUBLICATIONS

International Search Report for PCT/KR2018/004493 dated Aug. 7, 2018 from Korean Intellectual Property Office.

*Primary Examiner* — S. Joseph Morano
*Assistant Examiner* — Jovon E Hayes
(74) *Attorney, Agent, or Firm* — Paratus Law Group, PLLC

(57) ABSTRACT

Disclosed is a floating photovoltaic system installed over a wide area on a surface of water. The floating photovoltaic system includes a rotary bracket for connecting individual units that is able to be used for a long period of time without frequent replacement or repair by, while connecting the individual units, actively accommodating a vertical displacement, a horizontal displacement, and a rotational displacement of one individual unit relative to another individual unit.

11 Claims, 33 Drawing Sheets

(56) References Cited

FOREIGN PATENT DOCUMENTS

| KR | 10-1171683 | B1 | | 8/2012 | | |
|----|------------|----|---|--------|---|---|
| KR | 101171683 | B1 | * | 8/2012 | ............. | B63B 35/34 |
| KR | 10-1507012 | B1 | | 3/2015 | | |
| KR | 10-1543727 | B1 | | 8/2015 | | |

* cited by examiner

FIG. 1

| | | Unit | | | | | | | |
|---|---|---|---|---|---|---|---|---|---|
| A1 | A1 | A1 | A1 | B1 | A1 | A1 | A1 | A1 | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A | A | A | B | A | A | A | A | A1 |
| A1 | A1 | A1 | A1 | B1 | A1 | A1 | A1 | A1 | A1 |

FLOATING PHOTOVOLTAIC SYSTEM

CROSS-REFERENCE TO PRIOR APPLICATIONS

This application is a National Stage Patent Application of PCT International Patent Application No. PCT/KR2018/004493 (filed on Apr. 18, 2018) under 35 U.S.C. § 371, which claims priority to Korean Patent Application Nos. 10-2017-0149611 (filed on Nov. 10, 2017) and 10-2017-0149624 (filed on Nov. 10, 2017), which are all hereby incorporated by reference in their entirety.

BACKGROUND

The present invention relates to a floating photovoltaic system, and more particularly, to a floating photovoltaic system installed over a wide area on a surface of water, the floating photovoltaic system including a rotary bracket for connecting individual units that is able to be used for a long period of time without frequent replacement or repair by, while connecting the individual units, actively accommodating a vertical displacement, a horizontal displacement, and a rotational displacement of one individual unit relative to another individual unit.

In recent years, regulations to suppress the emission of carbon dioxide have been implemented worldwide, and there has been a demand for development of new power generation devices that do not emit carbon dioxide.

A power generation device using sunlight is a typical example of a power generation device that does not emit carbon dioxide and uses clean energy. Nowadays, the distribution of power generation devices using sunlight has been expanded with a development in technology and a decrease in an installation cost thereof.

However, a power generation capacity of a photovoltaic system varies according to a power generation area and an amount of sunshine. In installing the photovoltaic system in a large area, there are many restrictions on the purchase of land due to the use of large land area, and there is a problem in that high cost is required for the purchase of land area or compensation therefor. Thus, in installing a large-scale power generation facility, there is a practical difficulty of having to induce cooperation of nearby residents.

Also, in a conventional photovoltaic system installed on the ground, an enormous amount of heat is generated in the process in which the photovoltaic system receives sunlight and generates electricity, and an enormous amount of sunshine is also transferred from the land on which the photovoltaic system is installed. Thus, there is a problem in that the heat and sunshine degrade performance of solar panels and cause the failure of the solar panels.

Accordingly, in order to address the above-mentioned problems and secure a wide open installation area that receives a large amount of sunlight, a floating photovoltaic system, in which solar panels are installed on a surface of water such as a river, a lake, a reservoir, and a dam, has actively been proposed and has been constructed in reality.

The floating photovoltaic system is formed of a plurality of solar panels, a profile assembly configured to support the plurality of solar panels to be placed on the surface of water, and a plurality of individual units connected to each other, wherein each individual unit has a float combined therewith. Generally, the connection between the individual units is performed using a simple connecting member in the form of a single rod. However, this may vary by site, and there is no standardized form of connecting member thus far.

However, in the case of the floating photovoltaic system, because a vertical displacement, a horizontal displacement, and a rotational displacement of one individual unit relative to another neighboring individual unit constantly occur due to waves and wind on the surface of water, there is a problem in that existing connecting members are not able to accommodate the vertical displacement, horizontal displacement, and rotational displacement of one individual unit relative to another neighboring individual unit, and thus the connecting members are easily damaged. Consequently, the connecting members are not able to be used for a long period of time, e.g., twenty years, together with other individual units, and it is necessary to carry out partial repairs regularly.

SUMMARY

The present invention is directed to providing a floating photovoltaic system installed over a wide area on a surface of water, the floating photovoltaic system including a rotary bracket for connecting individual units that is able to be used for a long period of time without frequent replacement or repair by, while connecting the individual units, actively accommodating a vertical displacement, a horizontal displacement, and a rotational displacement of one individual unit relative to another individual unit.

One aspect of the present invention provides a rotary bracket for connecting individual units of a floating photovoltaic system, which is formed of a plurality of solar panels, a profile assembly configured to support the plurality of solar panels to be placed above a surface of water, and a set of individual units each of which has a float combined therewith, wherein, in the floating photovoltaic system, the rotary bracket connects a one-side profile and an other-side profile in a longitudinal direction, the one-side profile and the other-side profile belonging to a profile assembly of one-side individual units and a profile assembly of other-side individual units, respectively, which are disposed at one side and the other side and neighbor each other, the rotary bracket includes a first coupling member coupled to an end portion of the one-side profile and a second coupling member coupled to an end portion of the other-side profile, and the first coupling member and the second coupling member are coupled to be vertically bendable relative to each other so that the rotary bracket is able to accommodate a vertical step difference and a rotational displacement of the one-side individual unit relative to the other-side individual unit.

Here, the first coupling member may include a c-shaped first end portion coupling part coupled in a state of being in contact from an upper surface to a lower surface of the end portion of the one-side profile and a pair of first cross-coupling parts configured to extend from the first end portion coupling part toward the other side and face each other in a state of being disposed at a left side and a right side and spaced apart from each other, and the second coupling member may include a c-shaped second end portion coupling part coupled in a state of being in contact from an upper surface to a lower surface of the end portion of the other-side profile and a pair of second cross-coupling parts configured to extend from the second end portion coupling part toward the one side, configured to face each other in a state of being disposed at the left side and the right side and spaced apart from each other, and coupled to be rotatable in the vertical direction in a state of crossing the pair of first cross-coupling parts.

Also, the first coupling member and the second coupling member may be made from two metal plate materials cut in the shape of a cross to include a central portion, a pair of first wing portions symmetrical to each other about the central portion, and a pair of second wing portions symmetrical to each other about the central portion and orthogonal to the first wing portions, wherein, regarding each metal plate material, the c-shaped first end portion coupling part and the c-shaped second end portion coupling part, which are formed of the central portion and the first wing portions, may be formed by the first wing portions being bent in one direction about the central portion, and the pair of first cross-coupling parts and the pair of second cross-coupling parts may be formed so as to face each other in a state of being bent in an opposite direction from the first wing portions about the central portion.

Also, the second coupling member may be coupled by a single bolt that vertically passes through the second coupling member and the end portion of the other-side profile so that the second coupling member is rotatable in a horizontal direction about the end portion of the other-side profile, and the second coupling member may be coupled to the end portion of the other-side profile with a clearance formed therebetween so that the second coupling member is rotatable in the horizontal direction about the end portion of the other-side profile.

Meanwhile, a floating photovoltaic system according to the present invention is formed of a plurality of solar panels, a profile assembly configured to support the plurality of solar panels to be placed above a surface of water, and a set of individual units each of which has a float combined therewith, wherein, for connection between the individual units, the floating photovoltaic system includes the rotary bracket described above.

Here, the float may be formed of a main body having a sealed empty space formed therein by separately forming two half main bodies by injection molding so that each half main body is in the shape of a container having a bottom panel and an outer wall, placing one of the two half main bodies above the other one in a state in which the one of the two half main bodies is flipped upside down, and then binding the two half main bodies in a state in which the two half main bodies face each other. A welding part formed along an upper end portion of the outer wall of the half main body may include multiple heat welding lines formed in layers outward from an inner side of an end portion of the outer wall so that heat welding is performed in multiple layers. In the empty space inside the main body that is formed due to binding between the half main bodies, a horizontal partition and a vertical partition may be formed to reinforce strength while crossing each other and forming multiple rooms. The outer wall of the half main body may be formed of a perpendicular portion formed to be perpendicular along a circumferential portion of the bottom panel and an inclined portion formed to be inclined from the perpendicular portion in a direction in which an outer side of the inclined portion gradually widens upward, so that the outer wall of the half main body has a shape that gradually protrudes toward the welding part where the outer walls of the half main bodies meet.

Also, at a lower end portion of the perpendicular portion of the outer wall, a reinforcing protrusion formed to protrude outward along a circumference of the perpendicular portion may be formed with a thickness that is eight times or larger than a thickness of the bottom panel.

Also, a plurality of ribs for reinforcement of strength may be formed in the shape of a checkerboard scale on the bottom panel so as to be orthogonal to each other. Ribs for reinforcement of strength may also be formed on the horizontal partition and the vertical partition so as to be connected to the ribs formed on the bottom panel. Brackets may be formed on an inner side surface of the outer wall so as to be connected to the ribs formed on the bottom panel.

Also, in the float, a through-tube configured to perpendicularly pass through the main body may be formed at every point where the horizontal partition and the vertical partition cross each other, and insulating supporters may be installed at the same height in inner holes of two through-tubes among the through-tubes. The float may include a first electrode rod fixed to one of the insulating supporters and installed in a form in which a lower end portion extends to the vicinity of a lower end portion of the through-tube and a second electrode rod which is fixed to the other one of the insulating supporters, has a smaller length than the first electrode rod, and has a lower end portion only extending to a portion slightly below an upper portion of the through-tube. The float may further include a comparator configured to receive and compare capacitance values due to the first electrode rod, the second electrode rod, and water introduced into the inner holes of the through-tubes, and a signal output part configured to receive a signal of the comparator and transmit a signal, which indicates which of the first electrode rod and the second electrode rod has come in contact with water, to the outside so that a risk of flooding of a facility installed at an upper portion of the float is determined.

Also, the floating photovoltaic system may further include a conductive grounding member which is installed in the main body and has an upper end portion connected to a portion of a waterborne structure above a surface of water and a lower end portion submerged in water and configured to connect the waterborne structure to the surface of water, thus being able to perform a grounding function. The grounding member may be installed on at least one outer side surface of outer side surfaces of the main body and installed from the upper end portion of the main body to the lower end portion thereof in a form coming in close contact along the shape of the outer side surface of the main body.

According to the present invention, a rotary bracket for connecting individual units of a floating photovoltaic system can be used for a long period of time without frequent replacement or repair by, while connecting the individual units, actively accommodating a vertical displacement, a horizontal displacement, and a rotational displacement of one individual unit relative to another individual unit.

In addition, according to the present invention, due to a configuration in which a float itself includes a conductive grounding member which performs a grounding function by connecting a portion of a waterborne structure above a surface of water to below the surface of water, it is possible to prevent corrosion of the structure due to residual current and prevent damage from lightning without the need to perform a difficult task of installing a ground wire connecting to the land.

In addition, according to the present invention, because an inner portion of the float is formed of a multi-room structure having a plurality of sealed spaces divided by partitions, it is structurally stable and intensive reinforcement of strength is performed for portions vulnerable to external impact caused by floating matter. Thus, damage due to floating matter such as drift ice or vegetation can be minimized, and a multi-room float with a reinforced welding part that is appropriate for implementing a large-sized product can be implemented.

A bracket for cross-connecting frames of the floating photovoltaic system according to the present invention can be easily connected in a state in which two frames which cross each other in the form of a cross are stably supported, and it is possible to minimize the number of fastening parts such as bolts.

In addition, according to the present invention, high rigidity can be secured with respect to rotational moment of inertia between connected frames, and a first stress distribution part and a second stress distribution part, each of which is formed of a curved surface having a semicircular cross-section, can induce stress to be distributed instead of being concentrated. Thus, under the same load condition, the maximum stress value is lower, and distribution of stress is stable.

In addition, according to the present invention, because a low-friction structure, which is differentiated from a first contact wing portion and a second contact wing portion, is formed on a surface of a main body portion, in the process of aligning the low-friction structure with the crossing frames, it is possible to easily slide the frames in a longitudinal direction of the low-friction structure and minimize damage between the low-friction structure and the frames.

BRIEF DESCRIPTION OF THE DRAWINGS

FIG. 1 is a layout of individual units in a floating photovoltaic system according to a first embodiment of the present invention.

DETAILED DESCRIPTION

Figure 2:
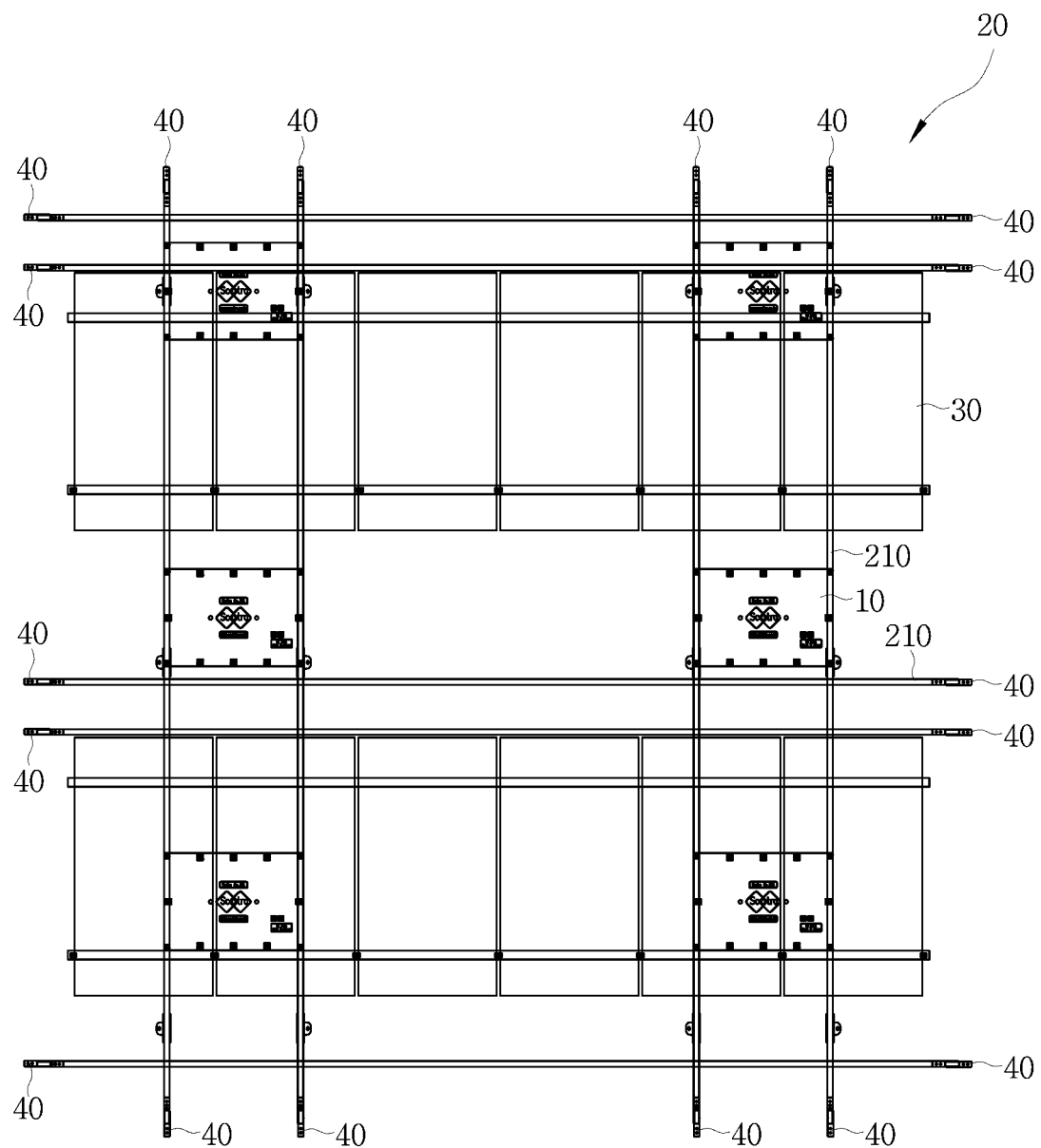
FIG. 2 is a plan view of the individual units in a state in which a rotary bracket for connecting the individual units is installed at an end portion of a profile in the floating photovoltaic system according to the first embodiment of the present invention.

A floating photovoltaic system according to embodiments of the present invention will be described in detail with reference to the accompanying drawings. Since various modifications may be made to the present invention and the present invention may have various embodiments, particular embodiments will be illustrated in the drawings and described in detail herein. However, this does not limit the present invention to the particular embodiments, and all modifications, equivalents, and substitutes included in the idea and scope of the present invention should be construed as belonging to the present invention. In describing each drawing, like elements are denoted by like reference numerals. In the accompanying drawings, the sizes of structures may be enlarged than reality for the sake of clarity of the present invention or may be reduced than reality to facilitate understanding of a schematic configuration.

Also, terms including ordinals such as first and second may be used to describe various elements, but the elements are not limited by the terms. The terms are only used for the purpose of distinguishing one element from another element. For example, a first element may be referred to as a second element while not departing from the scope of the present invention, and likewise, a second element may also be referred to as a first element. Meanwhile, unless defined otherwise, all terms including technical or scientific terms used herein have the same meaning as commonly understood by one of ordinary skill in the art to which the present invention pertains. Terms, such as those defined in commonly used dictionaries, should be construed as having a meaning that is consistent with their meaning in the context of the relevant art and are not to be construed in an idealized or overly formal sense unless expressly so defined herein.

First Embodiment

Figure 3:
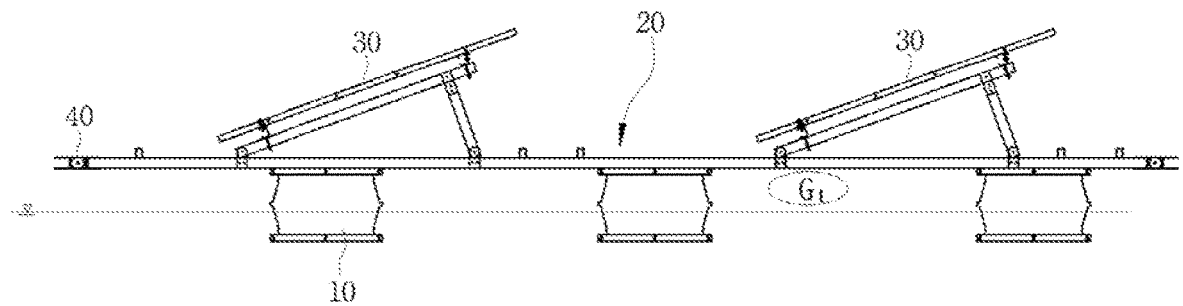
FIG. 3 is a side view of a portion of the floating photovoltaic system according to the first embodiment of the present invention.
Figure 4:
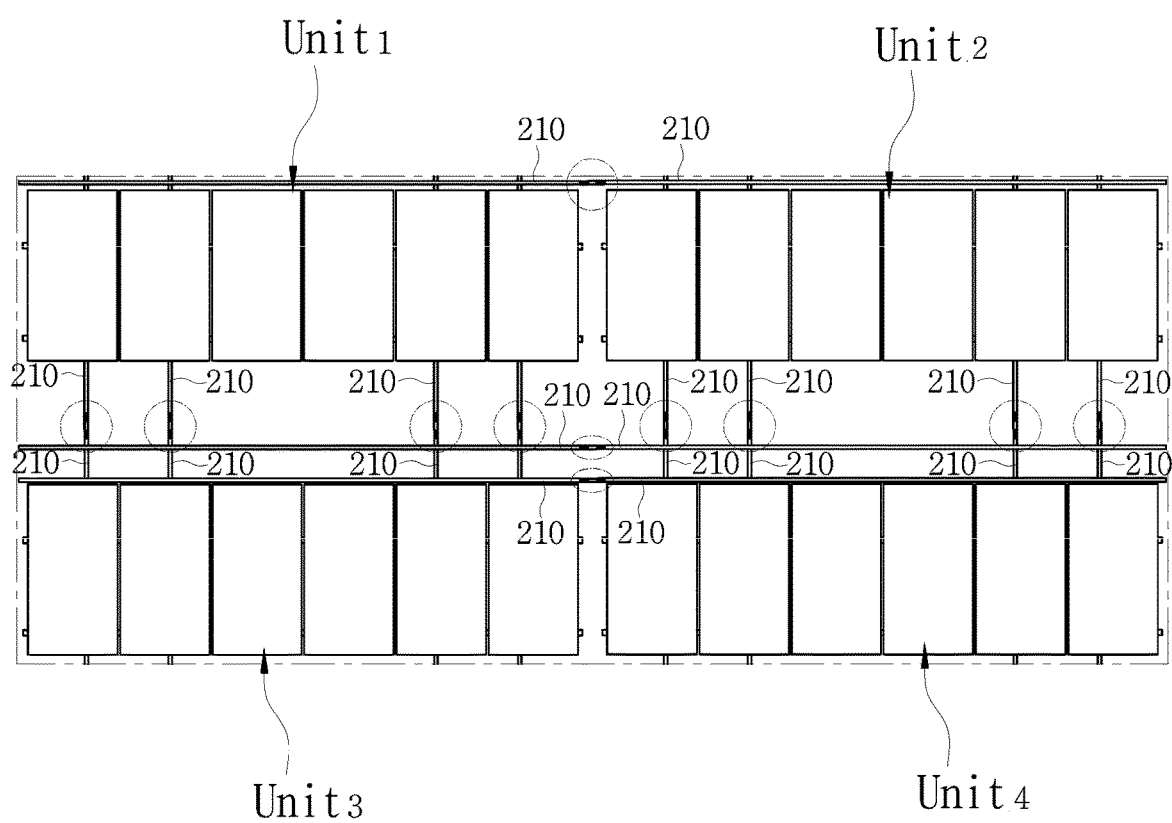
FIG. 4 is a plan view of a portion showing a state in which the individual units are connected by the rotary bracket for connecting the individual units in the floating photovoltaic system according to the first embodiment of the present invention.

FIG. 1 is a layout of individual units in a floating photovoltaic system according to a first embodiment of the present invention, FIG. 2 is a plan view of the individual units in a state in which a rotary bracket for connecting the individual units is installed at an end portion of a profile in the floating photovoltaic system according to the first embodiment of the present invention, FIG. 3 is a side view of a portion of the floating photovoltaic system according to the first embodiment of the present invention, and FIG. 4 is a plan view of a portion showing a state in which the individual units are connected by the rotary bracket for connecting the individual units in the floating photovoltaic system according to the first embodiment of the present invention.

As illustrated, the floating photovoltaic system according to the first embodiment of the present invention includes a profile assembly 20 configured to support a plurality of solar panels 30 above a surface of water and tens of a plurality of individual units each of which has a float 10 combined therewith that are arranged at a left side and a right side over a wide area in the form of a checkerboard (FIG. 1 shows a state in which individual units of types A, A1, B, and B1 are arranged.). As illustrated in FIGS. 2 to 4, the individual units are connected to each other by a rotary bracket 40 for connecting the individual units.

In such a configuration of the floating photovoltaic system, the rotary bracket 40 for connecting the individual units is configured to be used for a long period of time, e.g., about twenty years, without frequent replacement or repair by, while connecting the individual units, actively accommodating a vertical displacement, a horizontal displacement, and a rotational displacement of one individual unit relative to another individual unit.

Hereinafter, the floating photovoltaic system according to the first embodiment of the present invention will be described in more detail, focusing on the rotary bracket 40 for connecting the individual units.

Figure 5:
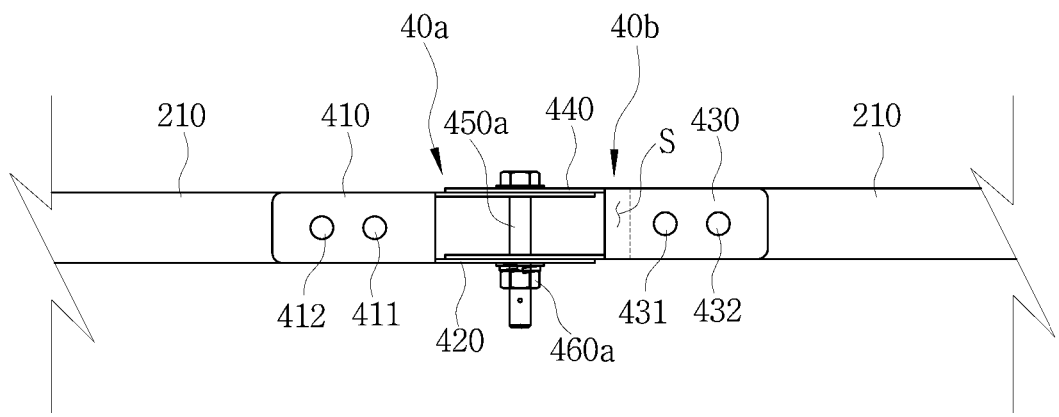
FIG. 5 is a plan view of the rotary bracket for connecting the individual units in the floating photovoltaic system according to the first embodiment of the present invention.
Figure 6:
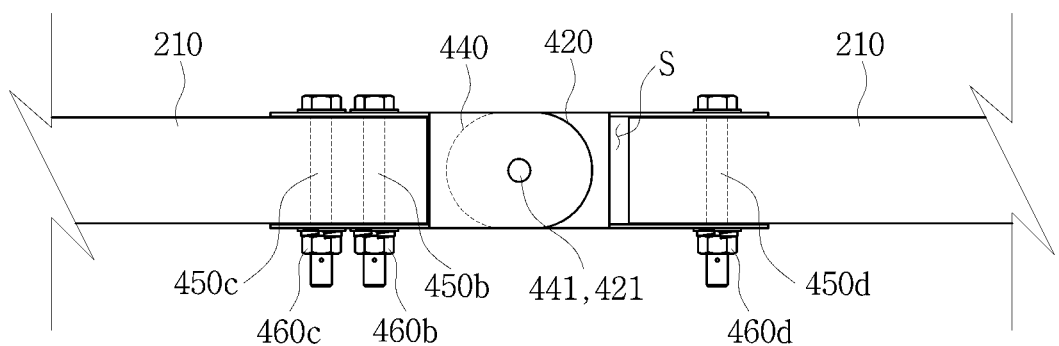
FIG. 6 is a side view of the rotary bracket for connecting the individual units in the floating photovoltaic system according to the first embodiment of the present invention.
Figure 7:
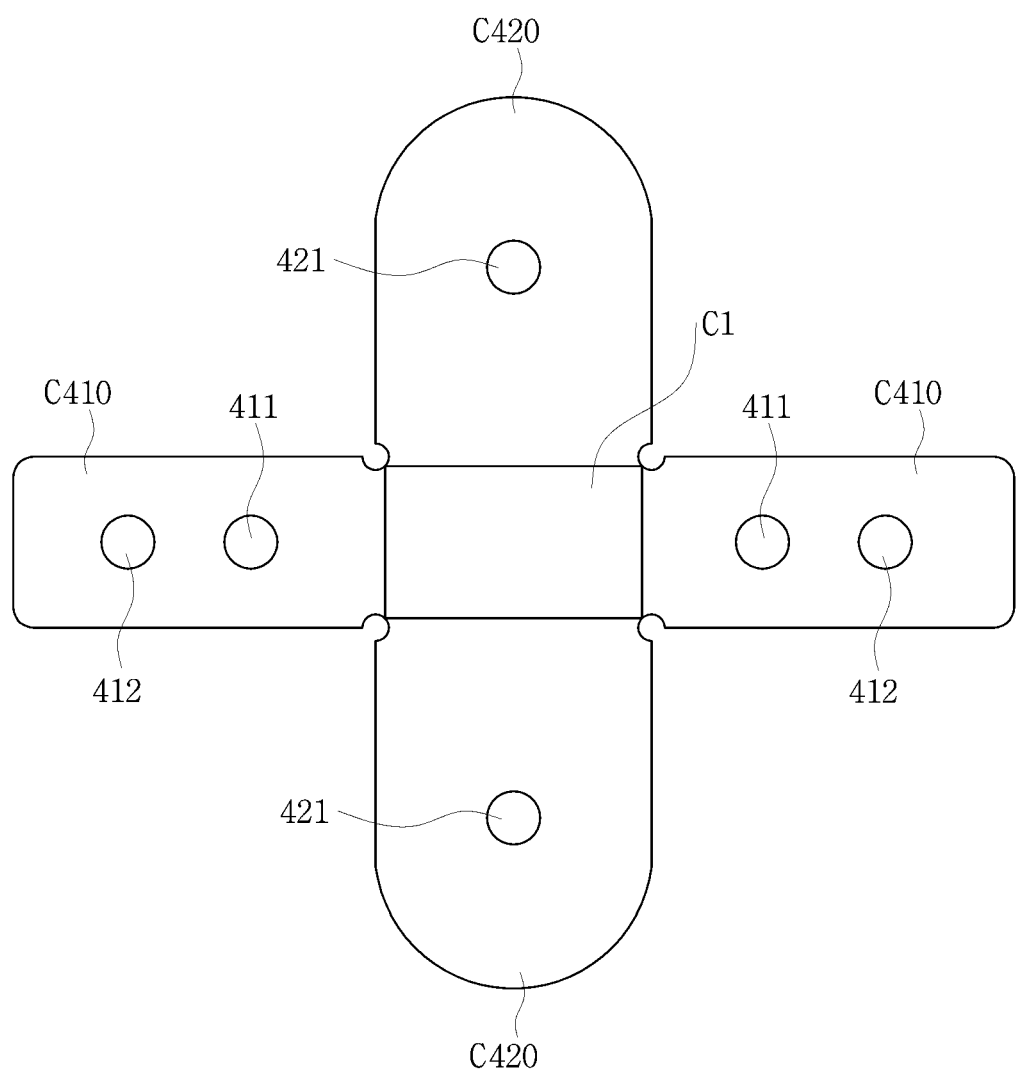
FIG. 7 is a development view for making a first coupling member of the rotary bracket for connecting the individual units in the floating photovoltaic system according to the first embodiment of the present invention.

FIG. 5 is a plan view of the rotary bracket for connecting the individual units in the floating photovoltaic system according to the first embodiment of the present invention, and FIG. 6 is a side view of the rotary bracket for connecting the individual units in the floating photovoltaic system according to the first embodiment of the present invention. Also, FIG. 7 is a development view for making a first coupling member of the rotary bracket for connecting the individual units in the floating photovoltaic system according to the first embodiment of the present invention.

As illustrated, the rotary bracket 40 for connecting the individual units serve to connect a one-side profile 210 and an other-side profile 210 in a longitudinal direction, wherein the one-side profile 210 and the other-side profile 210 belong to a profile assembly 20 of one-side individual units and a profile assembly 20 of other-side individual units, respectively, which are disposed at one side and the other side and neighbor each other.

To this end, the rotary bracket 40 for connecting the individual units includes a first coupling member 40a coupled to an end portion of the one-side profile 210 and a second coupling member 40b coupled to an end portion of the other-side profile 210. As illustrated in FIG. 5, the first coupling member 40a and the second coupling member 40b are coupled to be vertically bendable relative to each other about a first bolt 450a as an axis of rotation. The first bolt 450a forms a pair with a first nut 460a and fastens the first coupling member 40a and the second coupling member 40b in a horizontal direction in a state in which the first coupling member 40a and the second coupling member 40b overlap each other. In this way, the rotary bracket 40 is able to accommodate a vertical step difference and a vertical rotational displacement of one-side individual unit relative to the other-side individual unit. Further, in order to prevent bolts from loosening and falling while nuts are fastened thereto, a pin hole 451 is perforated in an opposite end portion of a head part, and an R-pin (not illustrated) is fitted and installed in the pin hole 451.

In more detail regarding the rotary bracket 40 for connecting the individual units, the first coupling member 40a includes a first end portion coupling part 410 that is c-shaped and coupled in a state of being in contact from an upper surface to a lower surface of the end portion of the one-side profile 210 and a pair of first cross-coupling parts 420 configured to extend from the first end portion coupling part 410 toward the other side and face each other in a state of being disposed at a left side and a right side and spaced apart from each other. As illustrated in FIG. 7, the first coupling member 40a is made from a metal plate material cut in the shape of a cross to include a central portion C1, a pair of first wing portions C410 symmetrical to each other about the central portion C1, and a pair of second wing portions C420 symmetrical to each other about the central portion C1 and orthogonal to the first wing portions C410. That is, regarding the metal plate material, the c-shaped first end portion coupling part 410, which is formed of the central portion C1 and the first wing portions C410, is formed by the first wing portions C410 being bent in one direction about the central portion C1, and the pair of first cross-coupling parts 420 are formed so as to face each other in a state of being bent in an opposite direction from the first wing portions C410 about the central portion C1 and being spaced apart from each other. Here, in order to allow a bolt to pass through, two bolt holes are perforated in the first wing portion C410, and a single bolt hole is perforated in the second wing portion C420.

The second coupling member 40b includes a second end portion coupling part 430 that is c-shaped and coupled in a state of being in contact with an upper surface and a lower surface of the end portion of the other-side profile 210 and a pair of second cross-coupling parts 440 configured to extend from the second end portion coupling part 430 toward the one side, face each other in a state of being disposed at the left side and the right side and spaced apart from each other, and, in a state of crossing the pair of first cross-coupling parts 420, have the first bolt 450a pass therethrough in the horizontal direction and be fastened by the first nut 460a so that the pair of second cross-coupling parts 440 are rotatable in the vertical direction. In order to allow the first bolt 450a to pass through the first cross-coupling parts 420 of the first coupling member 40a and the second cross-coupling parts 440 of the second coupling member 40b, preferably, the first cross-coupling parts 420 and the second cross-coupling parts 440 may be made to have bolt holes 421 and 441 perforated therein in advance. The second coupling member 40b is made from a metal plate material having a development view illustrated in FIG. 7 using the same method as the method of making the first coupling member 40a.

Note that, in the configuration of the rotary bracket 40 for connecting the individual units, the first end portion coupling part 410 is fastened at a plurality of points using a second bolt 450b and a second nut 460b and using a third bolt 450c and a third nut 460c so that the first coupling member 40a is stably fixed without rotating about the end portion of the one-side profile 210, but, in the case of the second coupling member 40b, the second end portion coupling part 430 is coupled to be rotatable relative to the end portion of the other-side profile 210 in the horizontal direction about a fourth bolt 450d, which passes through the second coupling member 40b and the end portion of the other-side profile 210 in the vertical direction, as the axis of rotation. For the coupling in which rotation is possible, the second coupling member 40b and the end portion of the other-side profile 210 are coupled in a state in which the fourth bolt 450d and a fourth nut 460d vertically pass therethrough only at a single point. As it can be seen in FIG. 6, a clearance S is provided to allow rotation of the second coupling member 40b and the end portion of the other-side profile 210 relative to each other. Here, two bolt holes 411 and 412 are perforated in the first end portion coupling part 410, two bolt holes 431 and 432 are also perforated in the second end portion coupling part 430, and a bolt is installed in any one of the two bolt holes.

According to such a configuration, the first coupling member 40a and the second coupling member 40b of the rotary bracket 40 for connecting the individual units are rotatable relative to each other in the vertical direction about the first bolt 450a as the axis of rotation, and the second coupling member 40b is rotatable relative to the end portion of the other-side profile 210 in the horizontal direction. Accordingly, the rotary bracket 40 is able to actively accommodate any vertical displacement, horizontal displacement, and rotational displacement of one individual unit relative to another individual unit.

Meanwhile, the detailed configuration, in which the first end portion coupling part 410 of the first coupling member 40a is coupled in the state of being in contact with the upper surface and the lower surface of the end portion of the one-side profile 210 and the second end portion coupling part 430 of the second coupling member 40b is coupled in the state of being in contact with the upper surface and the lower surface of the end portion of the other-side profile 210, may be notable. According to such a configuration, a concentrated load applied to a bolt may be reduced as compared to when the first end portion coupling part 410 of the first coupling member 40a is coupled to a left side surface and a right side surface of the end portion of the one-side profile 210 and the second end portion coupling part 430 of the second coupling member 40b is coupled to a left side surface and a right side surface of the end portion of the other-side profile 210. Thus, durability of the rotary bracket 40 is improved to an extent that the rotary bracket 40 is able to be used for a long period of time (the life of the rotary bracket 40 is expected to be twenty years).

Next, the float 10 having other technical features according to the present invention will be described.

The float 10 included in the floating photovoltaic system according to the first embodiment of the present invention is applied to various waterborne structures to prevent corrosion of the structure due to residual current and effectively prevent damage from lightning. The float 10 itself includes a conductive grounding panel 150, which is a grounding member that performs a grounding function by connecting to the surface of water from the profile assembly 20 configured to support the solar panels 30. Due to such a configuration, it is possible to prevent corrosion of the structure due to residual current and effectively prevent damage from lightning without the need to perform a difficult task of installing a ground wire connecting to the land.

Also, because an inner portion of the float 10 is formed of a multi-room structure having a plurality of sealed spaces divided by partitions, it is structurally stable and intensive reinforcement of strength is performed on a welding part and an outer wall, which may be vulnerable to external impact caused by floating matter, so that the welding part and the outer wall are not damaged due to impact even when collision with floating matter, such as drift ice or vegetation, occurs. Thus, the float 10 is configured to have durability that allows the float 10 to be balanced as a whole. In this way, because the float 10 is very stable structurally despite being formed by injection molding to have a high-quality thin, uniform outer wall, the float 10 has advantages in that it is possible to implement a large-sized product having a size of 1,000 mm or more and is not easily damaged even in a harsh environment where collision with floating matter occurs frequently.

Figure 8:
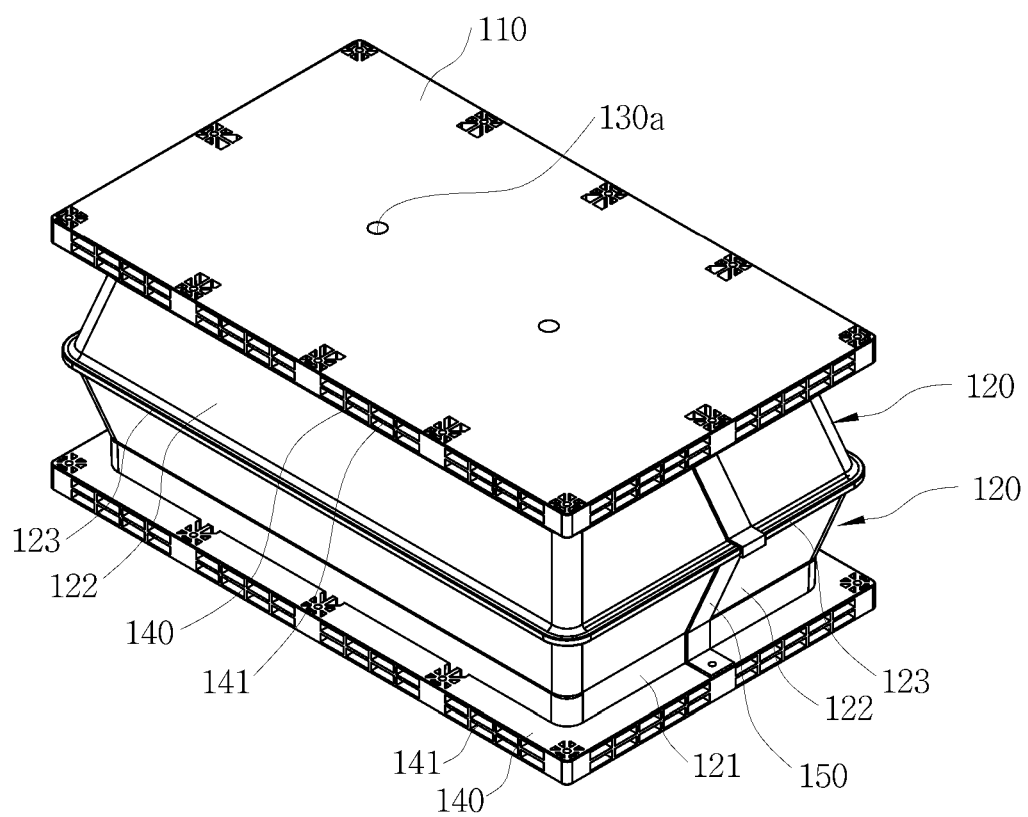
FIG. 8 is a perspective view of a float in the floating photovoltaic system according to the first embodiment of the present invention.
Figure 9:
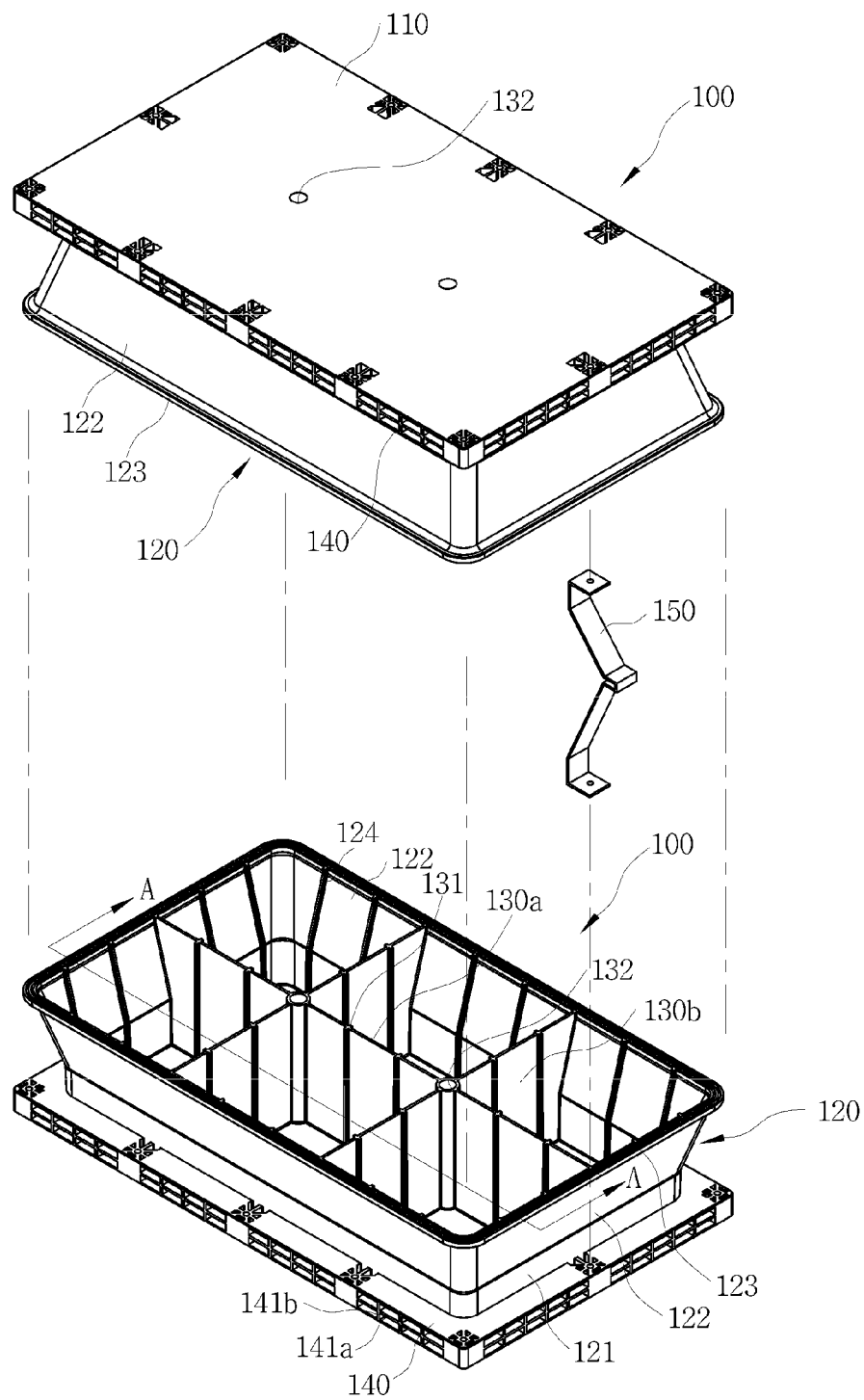
FIG. 9 is a reference perspective view illustrating a state in which half main bodies of the float are separated before being heat-welded in the floating photovoltaic system according to the first embodiment of the present invention.
Figure 10:
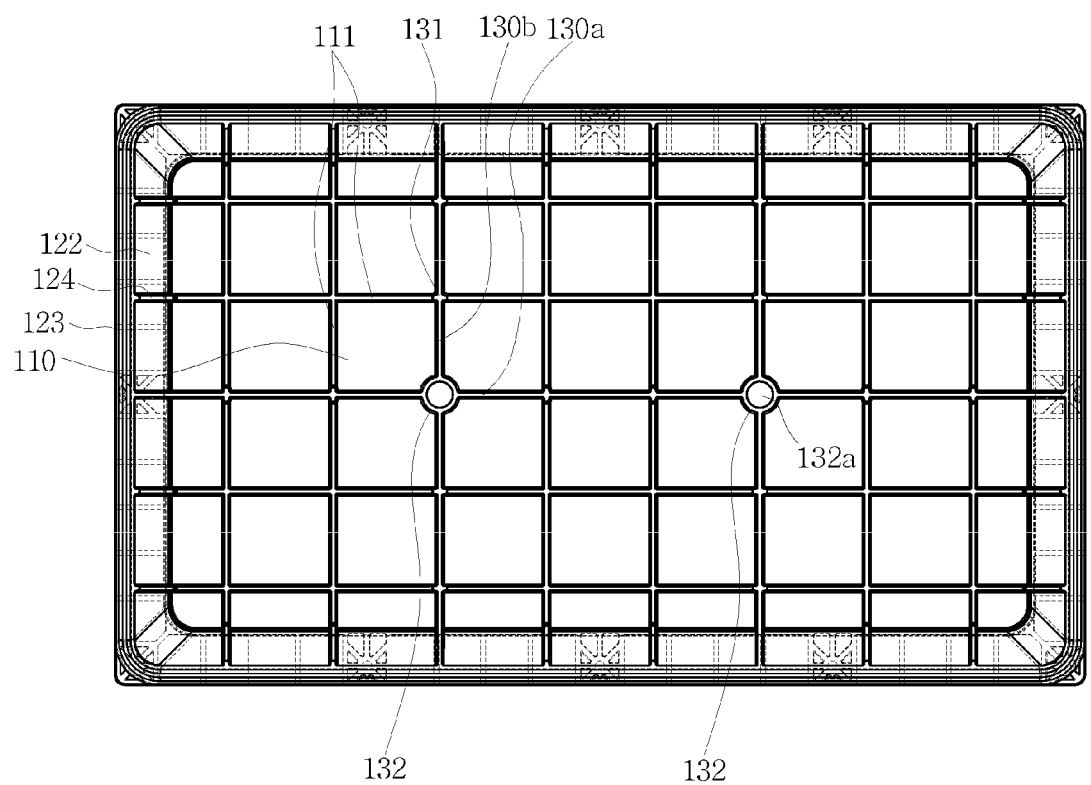
FIG. 10 is a plan view of the half main body of the float in the floating photovoltaic system according to the first embodiment of the present invention.
Figure 11:
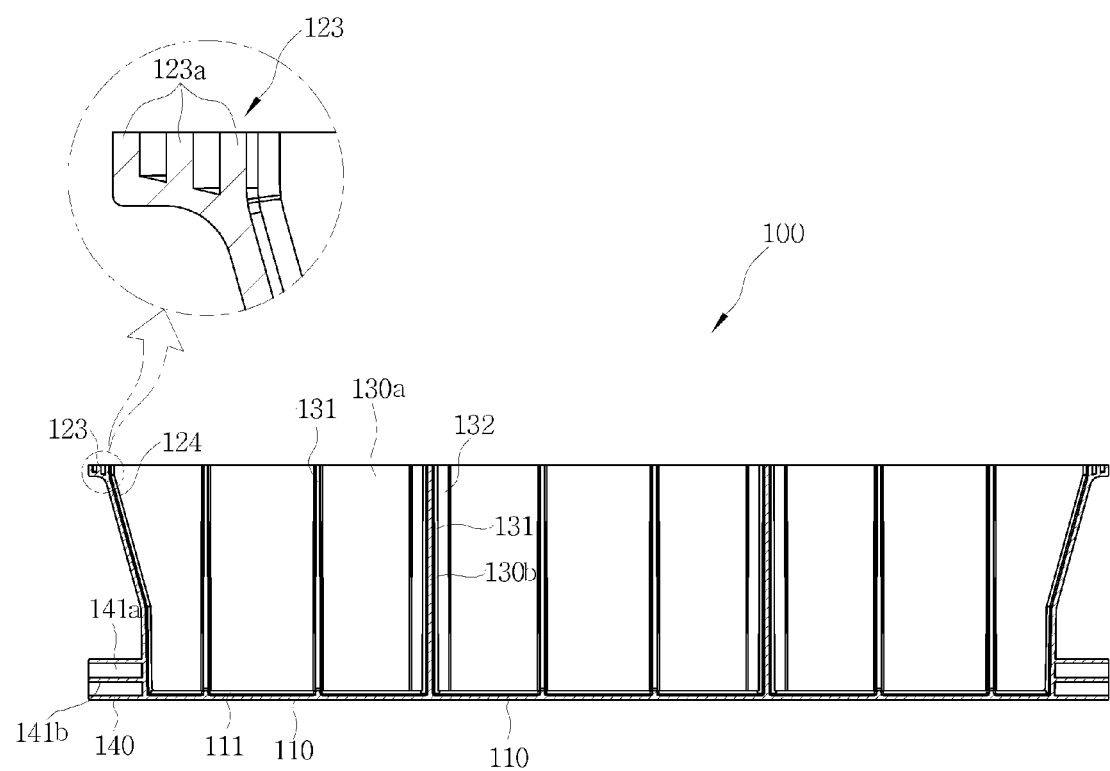
FIG. 11 is longitudinal cross-sectional view taken along line A-A of FIG. 10.

FIG. 8 is a perspective view of a float in the floating photovoltaic system according to the first embodiment of the present invention, FIG. 9 is a reference perspective view illustrating a state in which half main bodies of the float are separated before being heat-welded in the floating photovoltaic system according to the first embodiment of the present invention, FIG. 10 is a plan view of the half main body of the float in the floating photovoltaic system according to the first embodiment of the present invention, and FIG. 11 is longitudinal cross-sectional view taken along line A-A of FIG. 10.

As illustrated, the float 10 is formed of a main body 10a that has a sealed empty space formed therein by binding between two half main bodies 100 and forms a buoyant force and the conductive grounding panel 150 that is installed in the main body 10a and has an upper end portion connected to the profile assembly 20 and a lower end portion submerged in water so as to perform a grounding function.

Of the main body 10a and the grounding panel 150, the grounding panel 150 is installed at any one outer side surface or two or more outer side surfaces of the outer side surfaces of the main body 10a. Note that, as illustrated in FIG. 8, the grounding panel 150 is installed in a form coming in close contact along the shape of the outer side surface of the main body 10a so as to reach the lower end portion of the main body 10a from the upper end portion thereof and does not protrude to the outer side of the main body 10a. Further, although the thickness of the grounding panel 150 is very thin, in order to prevent even the very thin grounding panel 150 from protruding, preferably, a seating groove may be formed at the time of molding so that the grounding panel 150 may be seated on the corresponding outer side surface of the main body 10a.

According to the configuration of the present invention in which the grounding panel 150 is installed in the main body 10a of the float, in the floating photovoltaic system, twelve or more ground connections are made based on a single individual unit (a breadth of 6.4 m and a length of 7.5 m), and as many as 2,844 ground connections are made based on a single block (a breadth of 100 m and a length of 92 m). In this way, because an equipotential is formed due to the ground connections, in a case in which lightning strikes the structure, the lightning is uniformly distributed over a large area, and damage due to the lightning may be minimized. Also, there is an effect of preventing corrosion of the structure due to residual current flowing in the profile assembly made of non-ferrous metal or a special alloy resistant to corrosion.

Here, note that, when the float 10 including the grounding panel 150 is used, it is only necessary to fasten the upper end portion of the main body 10a of the float, in which the grounding panel 150 is installed, and the profile assembly 20 by simply using a bolt 21 without the need to perform a difficult task of installing a ground wire. The bolt fastening task belongs to an ordinary task performed to fasten the float 10 and the profile assembly 20 regardless of the grounding panel 150.

Meanwhile, the grounding panel 150 may be in the shape of a band which is vertically long and has a narrow width as illustrated in FIG. 8, but may also be provided in a larger size. When the grounding panel 150 is provided in a size that covers half or more of an area of the outer side surface on which the grounding panel 150 is installed, it is very helpful to safely protect the main body 10a of the float from external contact or impact. Particularly, damage to the main body 10a of the float due to floating matter that float on a surface of water during floods or droughts may be prevented, and damage to the main body 10a of the float may be minimized even when the surface of water is frozen in winter. In order to enhance the protection function by the grounding panel 150, the grounding panel 150 may also be installed on all of the outer side surfaces of the main body 10a of the float 10.

Hereinafter, the main body 10a of the float that is formed by binding between the two half main bodies will be described in detail. The float 10 is formed of a main body having a sealed empty space formed therein by separately forming two half main bodies 100 by injection molding so that each half main body 100 is in the shape of a container having a bottom panel 110 and an outer wall 120, placing one of the two half main bodies 100 above the other one in a state in which the one of the two half main bodies 100 is flipped upside down and symmetrical to the other one, and then binding the two half main bodies 100 by heat welding.

Here, note that, as it can be seen in FIG. 11, a welding part 123 formed along an upper end portion of the outer wall 120 of the half main body 100 includes multiple heat welding lines 123a formed in layers outward from an inner side of the upper end portion of the outer wall 120. When the welding part 123 includes the multiple heat welding lines 123a, because the number of portions bound by heat welding is plural instead of singular, the portions, despite being binding portions, have a rather higher strength than other portions in terms of thickness and binding strength. Thus, it is possible to fully address a problem in that the welding part 123 is detached or damaged due to load or impact caused by collision with floating matter. Regarding the advanced method in which the two half main bodies 100 molded as separate entities are heat-welded to form a float which is a complete entity, despite having an advantage in that the entire walls are formed to be high-quality, thin, and uniform, the method has a problem in that the welding part 123 may be easily detached or damaged due to receiving a concentrated load. In this situation, because it is possible to intensively reinforce strength of the welding part 123 as described above, the welding part 123 may rather be transformed into the firmest portion having the highest strength. Particularly, taking into consideration that the portion where the welding part 123 is formed is a middle portion of the outer wall where collision with floating matter most frequently occurs based on the entire main body, it is preferable to reinforce the strength of the welding part 123 as described above.

Also, in the sealed space inside the main body that is formed due to binding between the half main bodies 100, a horizontal partition 130a and a vertical partition 130b configured to cross each other and form multiple rooms are formed. The horizontal partition 130a and the vertical partition 130b reinforce strength while forming a frame structure as a whole.

The half main body 100 is formed of the bottom panel 110, which is quadrilateral and has a round corner, and the outer wall 120, which is formed from a circumferential portion of the bottom panel 110 and is in the shape of a container. The outer wall 120 is formed of a perpendicular portion 121 formed to be perpendicular along the circumferential portion of the bottom panel 110, instead of being a simple flat panel, and an inclined portion 122 formed to extend from an upper end of the perpendicular portion 121 and be inclined so as to gradually widen outward toward the upper side. According to the configuration of the outer wall 120 having the inclined portion 122, as it can be seen in FIG. 8, the outer walls 120 of the half main bodies 100 gradually protrude toward the welding part 123 where the outer walls 120 of the half main bodies 100 meet. Such a configuration causes the welding part 123, which is transformed into the firmest portion in terms of structure due to the multiple heat welding lines 123a, to be a portion protruding outward the most from the outer wall 120 and induces the welding part 123 to come in contact first with floating matter that floats on the surface of water. In this way, the welding part 123 may relatively protect other portions of the outer wall 120 from collision. Further, the outer wall 120 having the inclined portion 122 has a form in which, when the two half main bodies 100 are bound such that a complete outer wall 120 is formed, the outer wall 120 gradually protrudes outward toward an intermediate height at which the welding part 123 is disposed. Thus, the outer wall 120 has a shape similar to an arch shape although the shape is not a perfect arch shape. In this way, the outer wall 120 may be significantly firmer in terms of structure as compared to when the outer wall 120 is formed of a simple plane.

A plurality of ribs 131 for reinforcement of strength are formed on the bottom panel 110, the horizontal partition 130a, and the vertical partition 130b. The ribs 131 formed on the bottom panel 110 are formed in the shape of a checkerboard scale in which the ribs 131 are orthogonal, and the ribs 131 connected to the ribs 131 formed on the bottom panel 110 are formed on the horizontal partition 130a and the vertical partition. Also, brackets 124 connected to the ribs 131 formed on the bottom panel 110 are formed on an inner side surface of the outer wall 120. When the ribs 131 and the brackets 124 are formed and the strength is reinforced, it is possible to secure a sufficient strength that the design requires even when the outer wall 120, the horizontal partition 130a, and the vertical partition 130b are formed with a smaller thickness.

A reinforcing protrusion 140 formed to protrude outward along a circumference of the perpendicular portion 121 is formed at a lower end portion of the perpendicular portion 121 of the outer wall 120. The reinforcing protrusion 140 is formed with a thickness that is eight to ten times larger than a thickness of the bottom panel 110 and serves to reinforce the strength of the bottom panel 110 to a sufficient level. Here, the reinforcing protrusion 140 has a frame structure in which a vertical panel 141a and a horizontal panel 141b are formed to cross each other, and thus the weight of the reinforcing protrusion 140 is reduced as compared to when the reinforcing protrusion 140 is formed with a one-body panel. Also, the extent to which the reinforcing protrusion 140 protrudes is the same as the extent to which the welding part 123 protrudes outward at the intermediate height of the entire main body, thereby achieving balance.

In this way, the float intensively reinforces the strength of the welding part 123, which may be structurally the most vulnerable, by heat-welding the welding part 123 in multiple layers to the multiple heat welding lines 123a, reinforces the strength of the outer wall 120 by the arch structure in which the inclined portion 122 is formed at the outer wall 120, and reinforces the strength of the bottom panel 110 by forming the reinforcing protrusion 140 whose upper end portion and a lower end portion have a thickness which is about ten times larger than the thickness of the bottom surface based on the entire main body. Also, the plurality of brackets 124 and ribs 131, which hold the horizontal partition 130a and the vertical partition 130b together, are densely formed while being spaced apart from the outer wall 120 and the bottom panel 110 whose strengths are reinforced by the above-described configurations. Thus, the strength of the entire inner portion including the horizontal partition 130a and the vertical partition 130b may also be reinforced.

Figure 14:
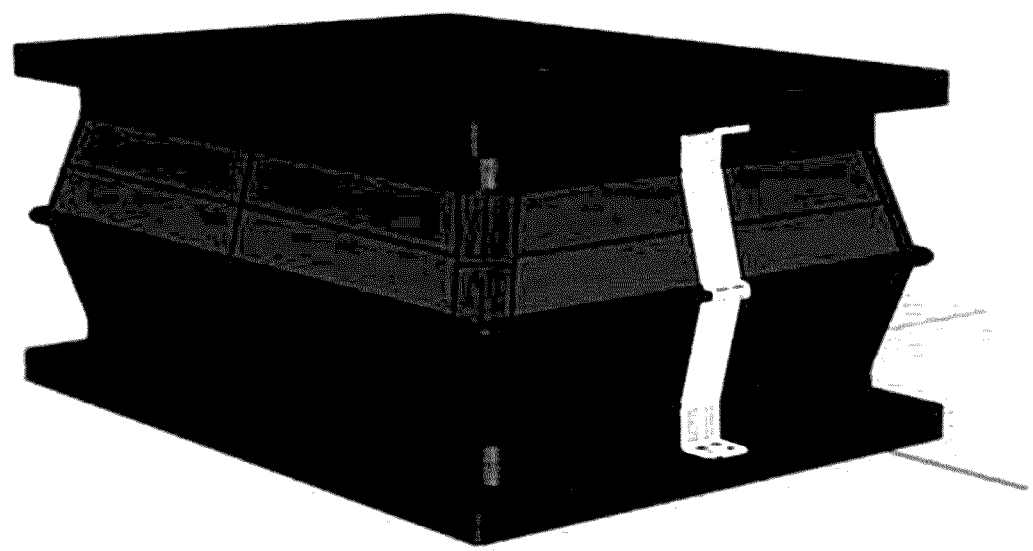
FIGS. 14 and 15 are 3D images for implementing actual samples of the float in the floating photovoltaic system according to the first embodiment of the present invention.
Figure 15:
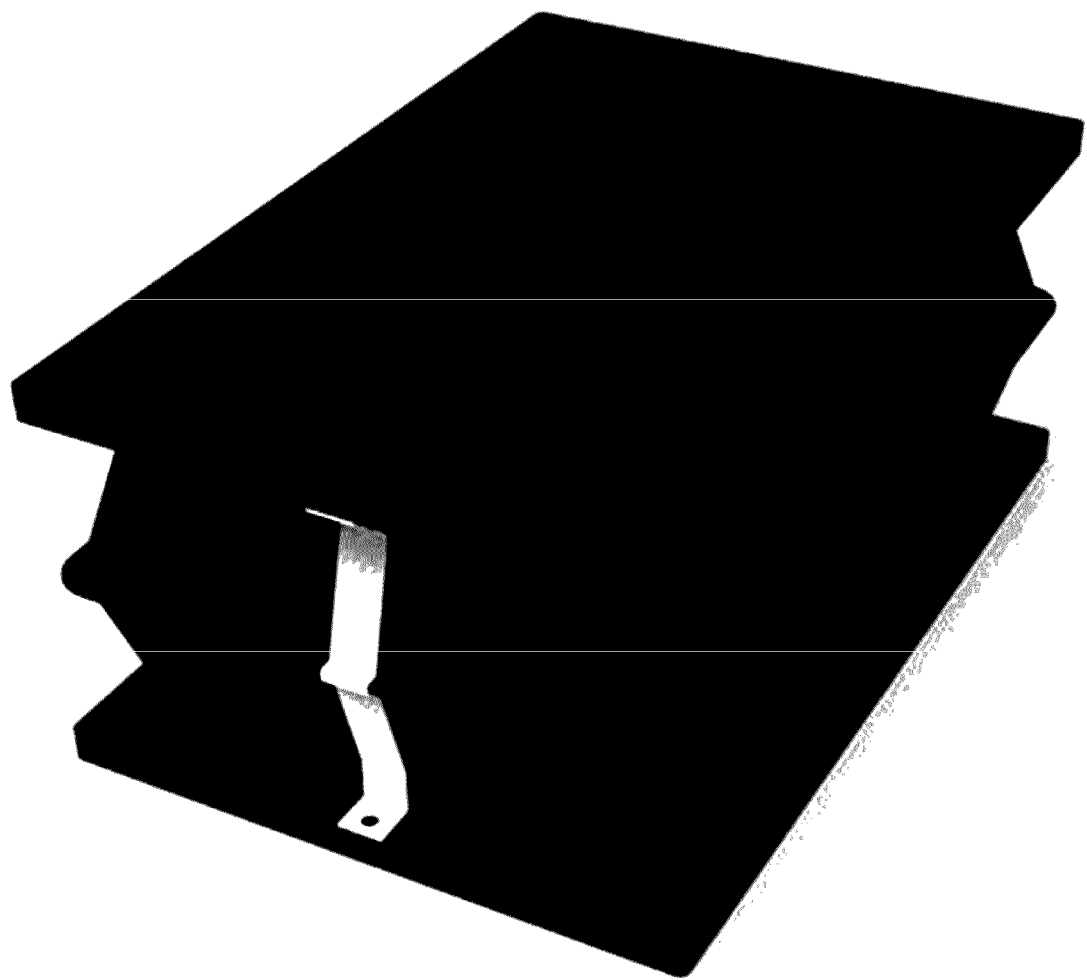

Images of actually implemented samples of the float are shown in FIGS. 14 and 15. It can be seen that, due to the above-described reinforcement structures, the float has a stiff, balanced outer shape, which is almost reminiscent of muscles. Also, it can be seen that a grounding panel is installed to come in close contact with an outer side surface of the float.

Next, additional configurations included in the float 10 will be described.

Figure 12:
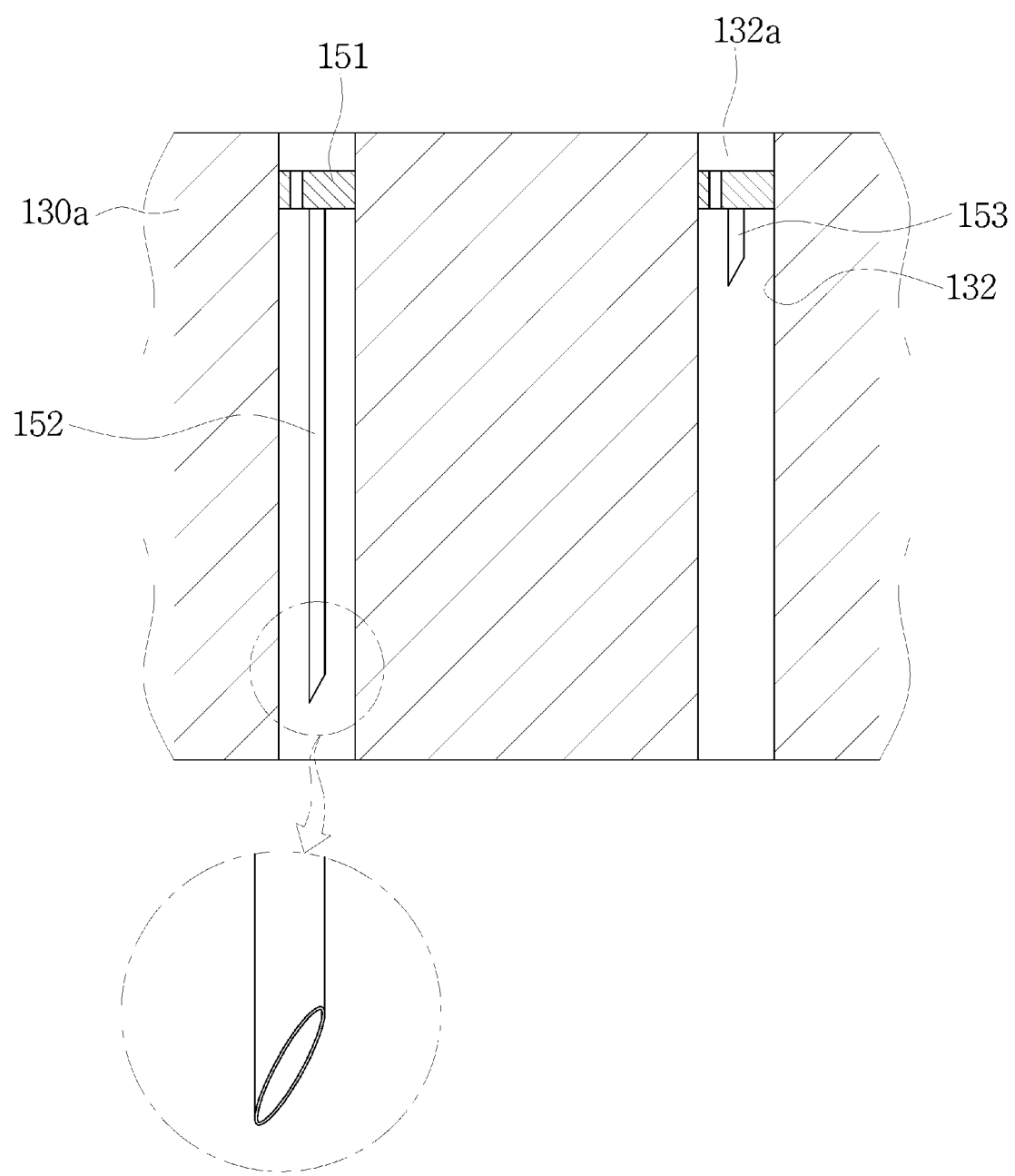
FIG. 12 is a cross-sectional view of a portion for describing multi-staged electrode rods for measuring a water level in the float of the floating photovoltaic system according to the first embodiment of the present invention.
Figure 13:
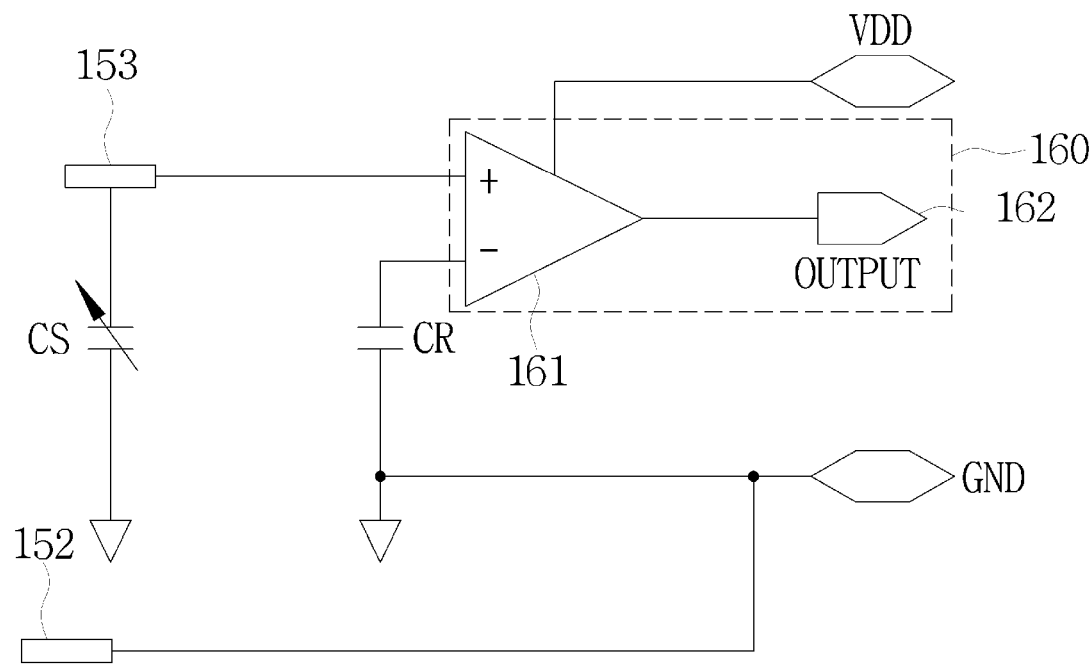
FIG. 13 is a circuit diagram for describing a signal part for measuring a water level in the float of the floating photovoltaic system according to the first embodiment of the present invention.

FIG. 12 is a cross-sectional view of a portion for describing multi-staged electrode rods for measuring a water level in the float 10, and FIG. 13 is a circuit diagram for describing a signal part for measuring a water level in the float 10.

As illustrated, in the float 10, insulating supporters 151 may be installed at the same height in inner holes 132a of two through-tubes 132 among the through-tubes 132 formed at every point where the horizontal partition 130a and the vertical partition 130b cross each other. The float 10 includes a first electrode rod 152 fixed to one of the insulating supporters 151 and installed in a form in which a lower end portion extends to the vicinity of a lower end portion of the through-tube 132 and a second electrode rod 153 which is fixed to the other one of the insulating supporters 151, has a smaller length than the first electrode rod 152, and has a lower end portion only extending slightly below an upper portion of the through-tube 132.

Also, the float 10 further includes a signal part 160 which includes a comparator 161 configured to receive and compare capacitance values due to the first electrode rod 152, the second electrode rod 153, and water introduced into the inner holes 132a of the through-tubes 132 and a signal output part 162 configured to receive a signal of the comparator 161 and transmit a signal, which indicates which of the first electrode rod 152 and the second electrode rod 153 has come in contact with water, to the outside.

The first electrode rod 152 comes in contact with water first before the second electrode rod 153 comes in contact with water. Thus, charge of the water is released through the ground connections, and malfunction of sensing is prevented. In addition, because strong static electricity applied from the outside is also released through the first electrode rod 152, stable sensing is guaranteed. Here, by making lower ends of the first electrode rod 152 and the second electrode rod 153 to be gradually sharp, surface tension that occurs when water hits the first electrode rod 152 and the second electrode rod 153 and then falls is minimized. Thus, malfunctions that may occur due to water making the first electrode rod 152 and the second electrode rod 153 unnecessarily wet may be prevented.

The comparator 161 receives and adjusts the capacitance values due to the first electrode rod 152, the second electrode rod 153, and water introduced into the inner holes 132a of the through-tubes 132. The capacitance values adjusted by the comparator 161 may be differentiated on the basis of a case in which only the first electrode rod 152 comes in contact with water and a case in which both the first electrode rod 152 and the second electrode rod 153 come in contact with water. The signal output part 162 may transmit different signals to a facility maintenance office according to the capacitance values compared by the comparator 161 (which are, for example, differentiated as 5.0 V and 2.5 V).

According to such a configuration, the first electrode rod 152 senses a case in which the float 10 is submerged to a large depth, and the second electrode rod 153 senses a case in which the float 10 is submerged to a small depth. When the first electrode rod 152 senses the case in which the float 10 is submerged to a large depth, this indicates that prompt action should be taken because there is a risk of flooding due to an excessive load of a facility installed at the upper portion of the float 10.

Exemplary embodiments of the present invention have been described above, but various changes, modifications, and equivalents of the present invention are possible. It is apparent that the embodiments may be applied in the same way even when the embodiments are modified to some extent. Therefore, the descriptions given above do not limit the scope of the present invention that is defined by the claims below.

Second Embodiment

Next, a floating photovoltaic system according to a second embodiment of the present invention will be described.

In a configuration of the floating photovoltaic system according to the second embodiment of the present invention, an elastic bracket 40 for connecting individual units is able to actively accommodate a vertical displacement, a horizontal displacement, and a rotational displacement of one individual unit relative to another individual unit while connecting the individual units. Further, the elastic bracket 40 for connecting the individual units is disposed at an intermediate portion and mitigates, absorbs, and blocks impact transmitted between the individual units, thereby reducing accumulation of fatigue load and significantly improving durability. Thus, the elastic bracket 40 for connecting the individual units may be used for a long period of time, e.g., about twenty years, without frequent replacement or repair.

Hereinafter, the floating photovoltaic system according to the second embodiment of the present invention will be described in more detail, focusing on the elastic bracket 40 for connecting the individual units.

Figure 16:
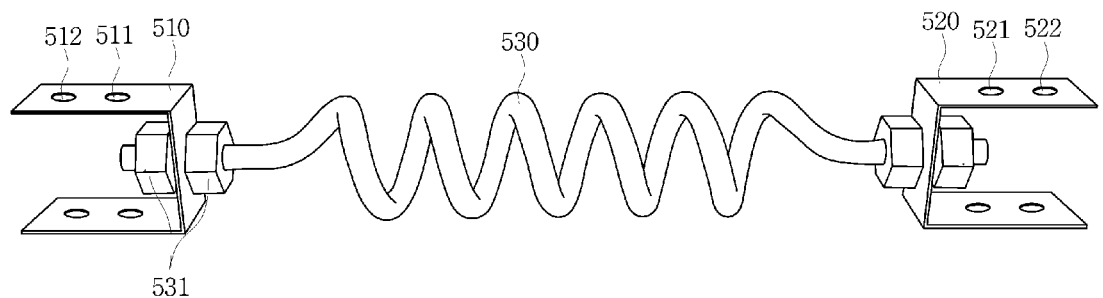
FIG. 16 is a perspective view of an elastic bracket for connecting individual units in a floating photovoltaic system according to a second embodiment of the present invention.
Figure 17:
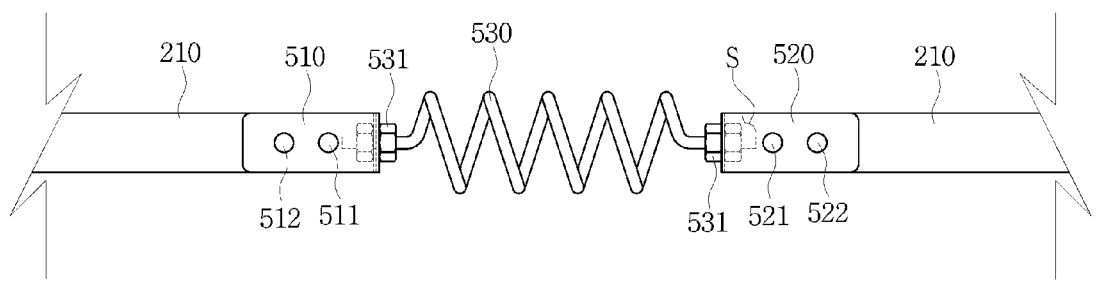
FIG. 17 is a plan view of the elastic bracket for connecting the individual units in the floating photovoltaic system according to the second embodiment of the present invention.
Figure 18:
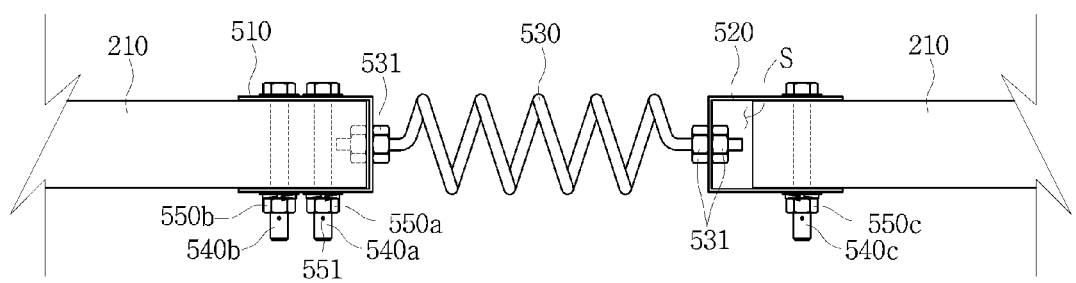
FIG. 18 is a side view of the elastic bracket for connecting the individual units in the floating photovoltaic system according to the second embodiment of the present invention.
Figure 19:
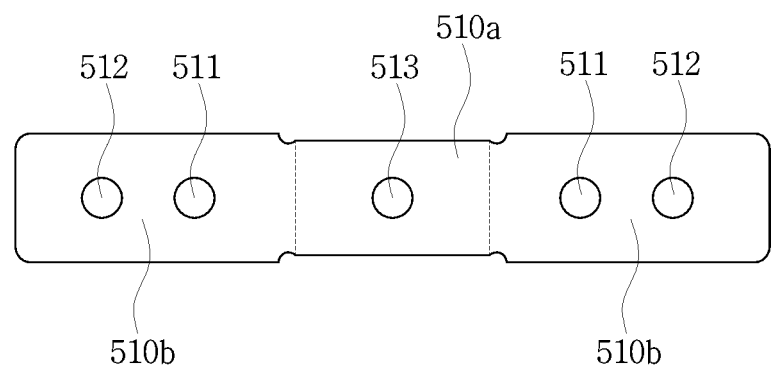
FIG. 19 is a development view for making a first coupling member of the elastic bracket for connecting the individual units in the floating photovoltaic system according to the second embodiment of the present invention.

FIG. 16 is a perspective view of an elastic bracket for connecting individual units in the floating photovoltaic system according to the second embodiment of the present invention, FIG. 17 is a plan view of the elastic bracket for connecting the individual units in the floating photovoltaic system according to the second embodiment of the present invention, and FIG. 18 is a side view of the elastic bracket for connecting the individual units in the floating photovoltaic system according to the second embodiment of the present invention. In addition, FIG. 19 is a development view for making a first coupling member of the elastic bracket for connecting the individual units in the floating photovoltaic system according to the second embodiment of the present invention.

As illustrated, the elastic bracket 40 for connecting the individual units serve to connect a one-side profile 210 and an other-side profile 210 in a longitudinal direction, wherein the one-side profile 210 and the other-side profile 210 belong to a profile assembly 20 of one-side individual units and a profile assembly 20 of other-side individual units, respectively, which are disposed at one side and the other side and neighbor each other.

To this end, the elastic bracket 40 for connecting the individual units includes a first coupling member 510 coupled to an end portion of the one-side profile 210, a second coupling member 520 coupled to an end portion of the other-side profile 210, and a coil spring 530 which is an elastic member configured to connect the first coupling member 510 and the second coupling member 520 and accommodate a vertical displacement, a horizontal displacement, and a rotational displacement between the first coupling member 510 and the second coupling member 520.

One end portion and the other end portion of the coil spring 530 may be simply bound to the first coupling member 510 and the second coupling member 520, respectively, by welding or the like. However, according to the embodiment, one end portion and the other end portion of the coil spring 530 are rollably coupled to the first coupling member 510 and the second coupling member 520, respectively, by passing therethrough. To this end, in a state in which one end portion and the other end portion of the coil spring 530 pass through the first coupling member and the second coupling member, respectively, a pair of nuts 531 are fastened in front of and behind each of the portion where the one end portion of the coil spring 530 passes through the first coupling member and the portion where the other end portion of the coil spring 530 passes through the second coupling member. Thus, the coil spring 530 is able to roll without falling. The coil spring 530 has a great advantage in that it is able to significantly improve durability by accommodating a vertical displacement, a horizontal displacement, and a rotational displacement between the individual units and, while being disposed at the intermediate portion, mitigating, absorbing, and blocking impact transmitted between the individual units.

The first coupling member 510 of the elastic bracket 40 for connecting the individual units is a c-shaped member coupled in a state of being in contact from an upper surface to a lower surface of the end portion of the one-side profile 210. The first coupling member 510 is fastened at a plurality of points using a first bolt 550*a* and a first nut 560*b* and using a second bolt 550*b* and a second nut 560*b* so that the first coupling member 510 is stably fixed without rotating about the end portion of the one-side profile 210. On the other hand, the second coupling member 520 is a c-shaped member coupled in a state of being in contact from an upper surface to a lower surface of the end portion of the other-side profile 210. The second coupling member 520 is fastened only at a single point using a third bolt 540*c* and a third nut 550*c* that vertically pass through the other-side profile 210. In this way, the second coupling member 520 is rotatable relative to the end portion of the other-side profile 210 in the horizontal direction about the third bolt 540*c* as the axis of rotation. Here, as it can be seen in FIG. 18, a clearance S is provided to allow rotation of the second coupling member 520 and the end portion of the other-side profile 210 relative to each other. For such a configuration, as it can be seen in FIG. 17, it is preferable that two bolt holes 511 and 512 are perforated in advance in the first coupling member 510, and, likewise, two bolt holes 521 and 522 are perforated in advance in the second coupling member 520. However, in the case of the second coupling member 520, a bolt is installed in only one of the two bolt holes 521 and 522 and serves as the axis of rotation. Further, in order to prevent bolts from loosening and falling while nuts are fastened thereto, a pin hole 551 is perforated in an opposite end portion of a head part, and an R-pin (not illustrated) is fitted and installed in the pin hole 551.

As illustrated in FIG. 19, the first coupling member 510 is manufactured using a metal plate material that is cut into a straight shape so as to include a central portion 510*a* and a pair of wing portions 510*b* which are symmetrical to each other about the central portion 510*a*. That is, in the metal plate material, the pair of wing portions 510*b* are bent in the same direction about the central portion 510*a* and face each other while being spaced apart such that the c-shaped first coupling member 510 is formed. Here, a first bolt hole 513 is perforated in the central portion 510*a* so that an end portion of the coil spring 530 passes therethrough, and the first bolt hole 511 and the second bolt hole 512 are perforated in the pair of wing portions 510*b* so that a first bolt 540*a* and a second bolt 540*b* pass therethrough. Meanwhile, the second coupling member 520 is manufactured in the same way as the first coupling member 510.

According to the configuration of the elastic bracket 40 for connecting the individual units, because the configuration including the coil spring 530 so that elastic displacement is possible, the configuration in which the end portion of the coil spring 530 is made to be rotatable in a rolling direction, and the configuration in which the second coupling member 520 is made to be rotatable in the horizontal direction about the end portion of the other-side profile 210 are applied in combination, the elastic bracket 40 for connecting the individual units is able to actively accommodate a vertical displacement, a horizontal displacement, and a rotational displacement of one individual unit relative to another individual unit.

Meanwhile, the detailed configuration, in which the first coupling member 510 and the second coupling member 520 are coupled in a state in which the first coupling member 510 is in contact with the upper surface and the lower surface of the end portion of the one-side profile 210 and the second coupling member 520 is in contact with the upper surface and the lower surface of the end portion of the other-side profile 210, may be notable. According to such a configuration, a concentrated load applied to a bolt may be reduced as compared to when the first coupling member 510 is coupled to the left side surface and the right side surface of the end portion of the one-side profile 210 and the second coupling member 520 is coupled to the left side surface and the right side surface of the end portion of the other-side profile 210. Thus, durability of the elastic bracket 40 is improved to an extent that the elastic bracket 40 is able to be used for a long period of time (the life of the elastic bracket 40 is expected to be twenty years). Here, being in the shape of a c-shaped member as illustrated in the drawings may be the most preferable for the first coupling member 510 and the second coupling member 520 in consideration of support strength, horizontal rotation at any one side, and the like. However, the first coupling member 510 and the second coupling member 520 may also be in the shape of a cap that is able to completely cover all sides of an end portion of a profile, the shape of a flat panel that only comes in contact with an end surface of the end portion of the profile, or the shape of an L-shaped member that comes in contact with the end surface and a side surface of the end portion of the profile.

Next, the float 10 having yet other technical features according to the present invention will be described.

The float 10 included in the floating photovoltaic system according to the second embodiment of the present invention is applied to various waterborne structures to prevent corrosion of the structure due to residual current and effectively prevent damage from lightning. The float 10 itself includes a conductive grounding panel 150, which is a grounding member that performs a grounding function by connecting to the surface of water from the profile assembly 20 configured to support the solar panels 30. Due to such a configuration, it is possible to prevent corrosion of the structure due to residual current and effectively prevent damage from lightning without the need to perform a difficult task of installing a ground wire connecting to the land.

Also, because an inner portion of the float 10 is formed of a multi-room structure having a plurality of sealed spaces divided by partitions, it is structurally stable and intensive reinforcement of strength is performed on a welding part and an outer wall, which may be vulnerable to external impact caused by floating matter, so that the welding part and the outer wall are not damaged due to impact even when collision with floating matter, such as drift ice or vegetation, occurs. Thus, the float 10 is configured to have durability that allows the float 10 to be balanced as a whole. In this way, because the float 10 is very stable structurally despite being formed by injection molding to have a high-quality thin, uniform outer wall, the float 10 has advantages in that it is possible to implement a large-sized product having a size of 1,000 mm or more and is not easily damaged even in a harsh environment where collision with floating matter occurs frequently.

Third Embodiment

Next, a floating photovoltaic system according to a third embodiment of the present invention will be described.

Figure 20:
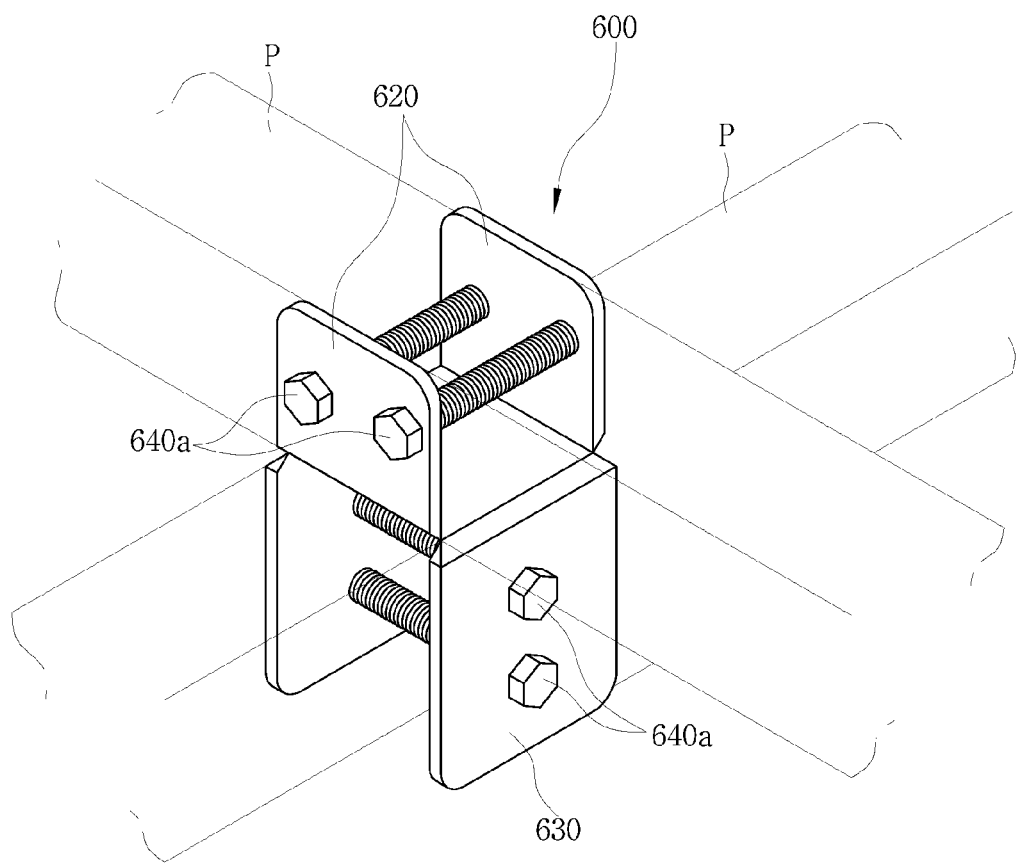
FIG. 20 is a reference perspective view showing a state in which two frames which cross each other in the form of a cross are connected by a bracket for cross-connecting frames according to a third embodiment of the present invention.

FIG. 20 is a reference perspective view showing a state in which two frames which cross each other in the form of a cross are connected by a bracket for cross-connecting frames according to a third embodiment of the present invention.

As illustrated, a bracket 600 for cross-connecting frames according to the third embodiment of the present invention is configured to simply, but stably, connect a first frame P1 and a second frame P2 which cross each other in the form of a cross in a frame assembly that supports solar panels while being supported by a float in a floating photovoltaic system.

To this end, the bracket 600 for cross-connecting the frames according to the third embodiment of the present invention forms a unique structure in which a U-shaped structure is applied in a complex manner so that it is able to surround and support the first frame P1 and the second frame P2 at the same time as illustrated in FIG. 20.

Hereinafter, the bracket 600 for cross-connecting the frames according to the third embodiment of the present invention will be described in more detail.

Figure 21:
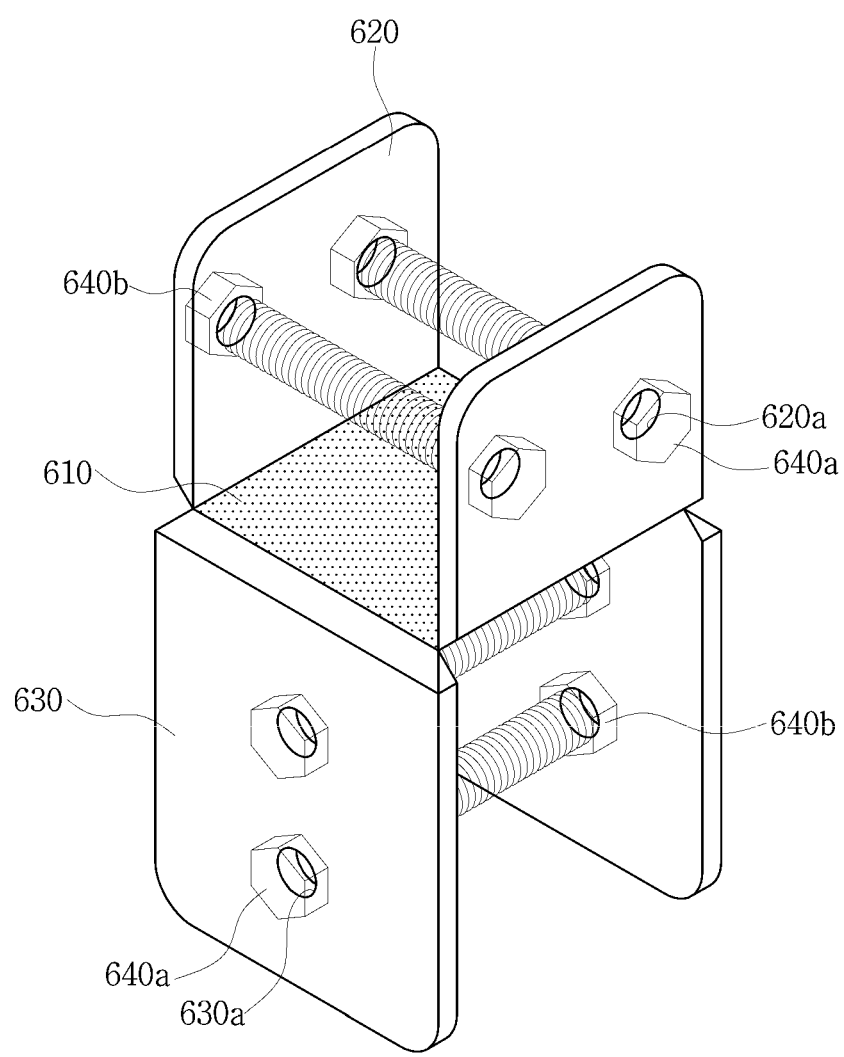
FIG. 21 is a perspective view for describing a configuration of the bracket for cross-connecting the frames according to the third embodiment of the present invention.
Figure 22:
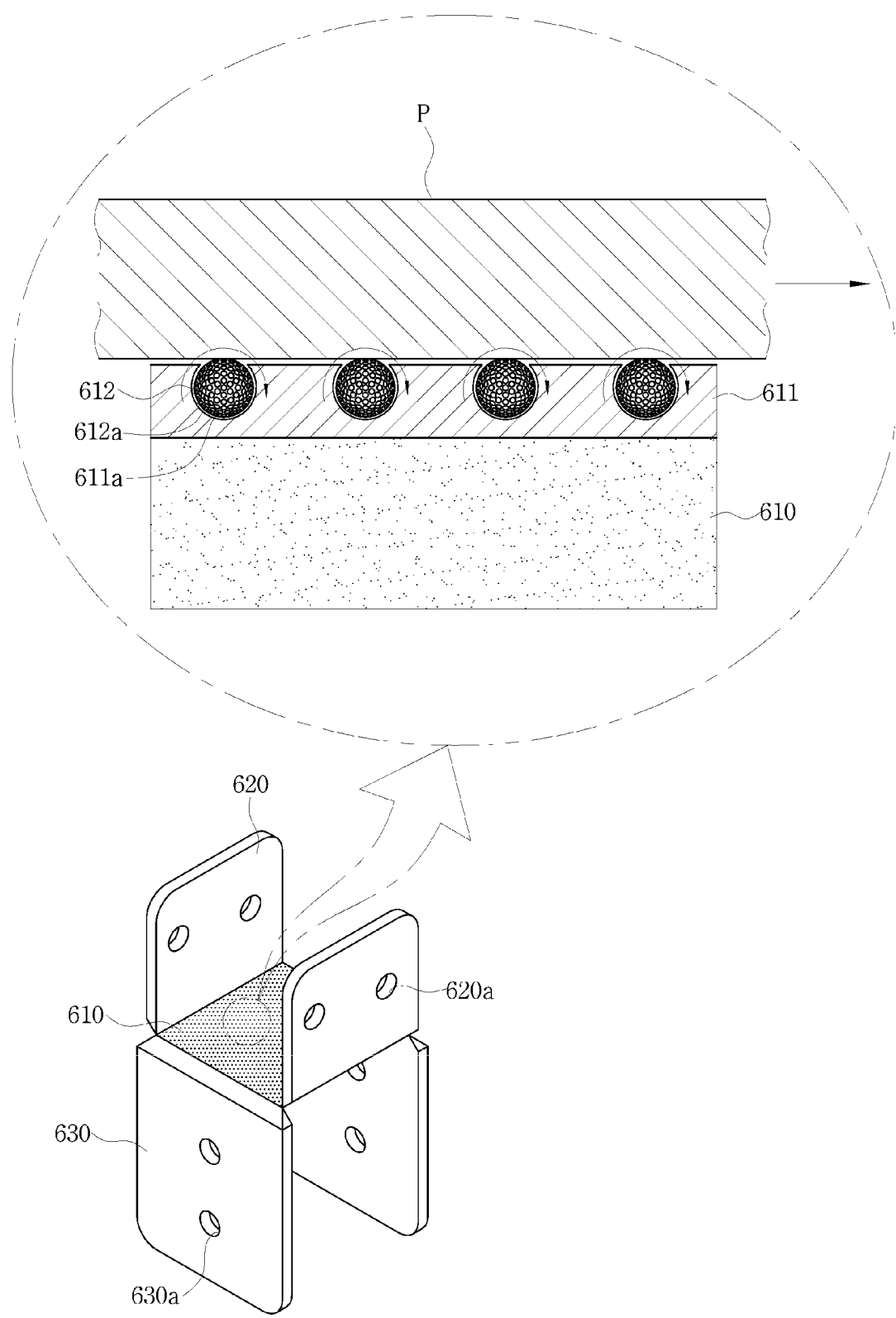
FIG. 22 is a reference diagram for describing a low-friction configuration applied to a main body portion of the bracket for cross-connecting the frames according to the third embodiment of the present invention.
Figure 23:
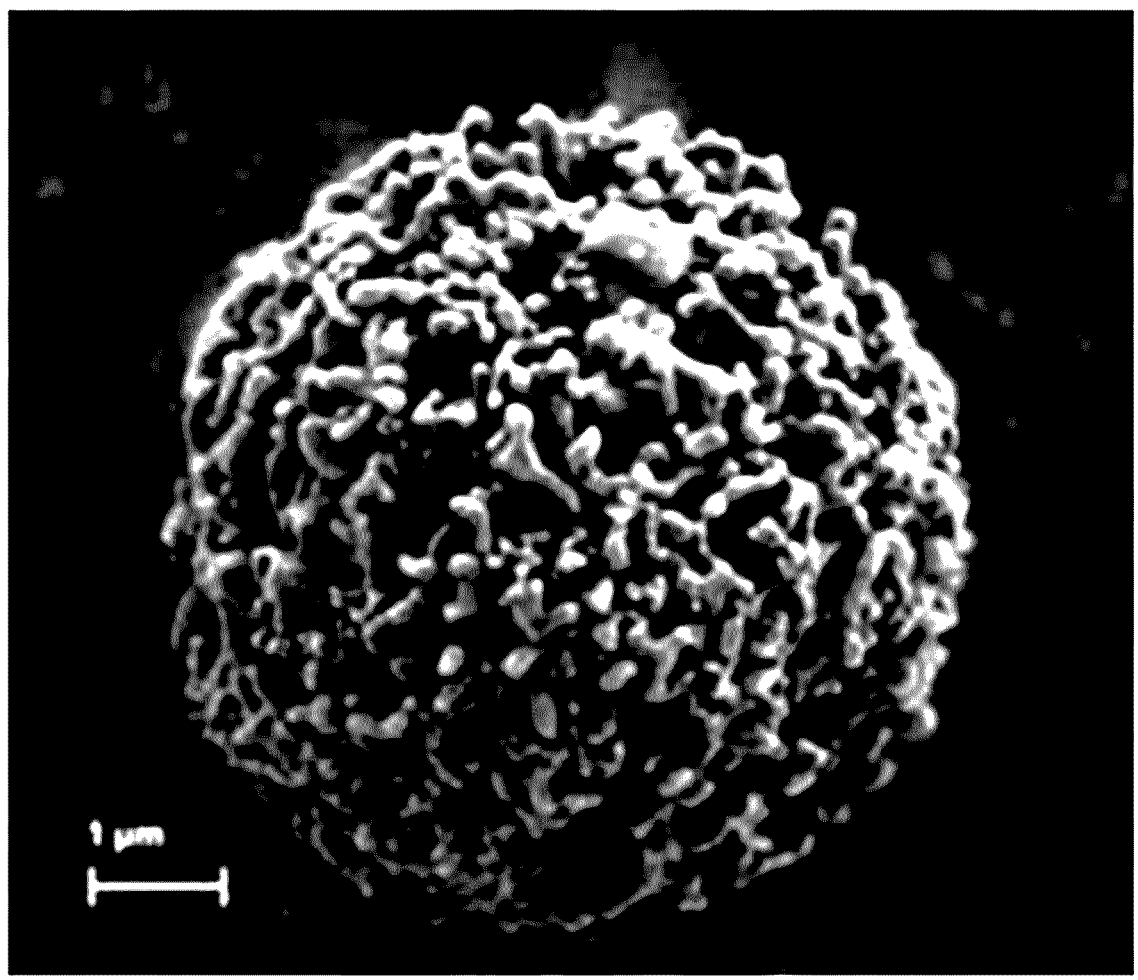
FIG. 23 is a reference image for describing a method using a spray drying method among various methods for forming solid lubricating particles which are one element constituting the low-friction structure on a surface of the main body portion in FIG. 22.

FIG. 21 is a perspective view for describing a configuration of the bracket for cross-connecting the frames according to the third embodiment of the present invention, and FIG. 22 is a reference diagram for describing a low-friction configuration applied to a main body portion of the bracket for cross-connecting the frames according to the third embodiment of the present invention. In addition, FIG. 23 is a reference image for describing a method using a spray drying method among various methods for forming solid lubricating particles which are one element constituting the low-friction structure on a surface of the main body portion in FIG. 22.

As illustrated, the bracket for cross-connecting the frames according to the third embodiment of the present invention has a form in which two U-shaped structures are formed by a main body portion 610 and a pair of first contact wing portions 620 and a pair of second contact wing portions 630 heading toward opposite directions.

The main body portion 610 is provided as a member in the shape of a quadrilateral panel whose upper surface and lower surface, which are surfaces opposing each other, come in contact with the first frame P1 and the second frame P2, respectively. The main body portion 610 comes in contact in a state in which the first frame P1 is in close contact with the upper surface and the second frame P2 is in close contact with the lower surface, which is the surface opposing the upper surface.

In the case of the main body portion 610, in the process of adjusting connection positions of the first frame P1 and the second frame P2, sliding between the first frame P1 and the second frame P2 is not smoothly performed due to friction therebetween. Thus, the position adjusting task is not smoothly performed, and it is likely that the surfaces of the first frame P1 and the second frame P2 will be damaged due to friction in the process in which sliding is performed while the first frame P1 and the second frame P2 are in contact with each other. Accordingly, in order to minimize surface friction therebetween, as illustrated in the enlarged portion of FIG. 22, a unique configuration, in which a plurality of dimples 611a are formed on a surface of the main body portion 610 and solid lubricating particles 612 configured to roll in place while being accommodated in the dimples 611a so as to serve as bearings are further included, is additionally provided.

Such a configuration is implemented by adopting a low-friction member using the dimples 611a that is applied to a vehicle engine, in consideration of the fact that sliding of the first frame P1 and the second frame P2 in a straight line for adjusting the positions thereof while the first frame P1 and the second frame P2 are in contact with the main body portion 610 is somewhat similar to the relationship between a piston and an inner wall of a cylinder in the vehicle engine that continuously rub against each other while the piston reciprocates in a straight line and rotates (refer to Korean Patent Registration No. 1507012 (Mar. 24, 2015)). However, by further development from here, a unique configuration in which the solid lubricating particles 612 are added to the dimples 611a so as to serve as bearings has been added.

According to such a configuration, a low-friction effect due to the plurality of dimples 611a at the time of surface contact with the main body portion 610 that is caused by movement of the first frame P1 and the second frame P2 and a low-friction effect due to the solid lubricating particles 612 that serve as bearings while rolling in place act in combination such that an excellent low-friction effect is achieved. Here, a plating layer 611 formed of a Ni-SiC material may be formed first on the surface of the main body portion 610, and then the dimples 611a may be formed on the plating layer 611. In this way, in addition to the low-friction effect of the solid lubricating particles 612, a higher level of low-friction effect can be expected.

According to the configuration in which the solid lubricating particles 612, which have a spherical shape, are accommodated in the dimples 611a, in an environment illustrated in FIG. 22 in which the main body portion 610 strongly slides and causes frictional contact due to movement of the first frame P1 and the second frame P2, the rolling movement of the solid lubricating particles 612 and the action of minimizing the contact area may minimize wear and friction of the plating layer 611. Further, according to materials constituting the solid lubricating particles 612, in the environment in which the main body portion 610 slides and causes frictional contact, fragment particles generated as the solid lubricating particles 612 gradually wear out may be mixed with a liquid lubricating agent and perform additional lubrication.

Here, the solid lubricating particles 612 may be manufactured to be suitable for an environment in which the present invention is practiced. Alternatively, the solid lubricating particles 612 may be provided by purchasing ready-made ones. For example, IF-WS$_2$ nanoparticles, synthesized by Weizmann Institute of Science in the early 1990s, began to be commercially produced in 2002. Unlike MOS$_2$ nanoparticles which are in the form of platelets, the IF-WS$_2$ particles are in a spherical shape with a diameter of about 3 to 350 nm. The IF-WS$_2$ particles seem to be able to be provided in micro units suitable for being accommodated in the dimples 611a. The IF-WS$_2$ particles are generally known to cause rolling friction between rough surfaces of metal, and thus are expected to be able to cause rolling friction also in a state of being accommodated in the dimples 611a as in the third embodiment of the present invention.

For reference, the spherical solid lubricating particles 612 may be provided in various ways using only the current technology. First, in order to provide the spherical particles, various methods may be used, such as a spray drying method, a mold forming method, a method using surface tension, in which, by flowing a melt or slurry on a surface with nano-protrusions, spherical bodies are formed using surface tension and spherical particles are provided through a subsequent process of cooling and drying, a method using the Lotus effect, and a molding method using a 3D printer.

Also, a plurality of fine oil pockets 612a for accommodating a liquid lubricating agent are formed on a surface of the solid lubricating particles 612 as if on a surface of a golf ball. The forming of the fine oil pockets 612a on the surface of the solid lubricating particles 612 may be performed using various methods. Among the methods, a spray drying method and a powder mold forming method are performed in an order in which fine powder particles smaller than the solid lubricating particles 612 are coagulated on the surface of the spherical particles, which are formed in advance, and then heat-treated. In this way, as illustrated in FIG. 23, fine oil pockets are naturally formed between the coagulated fine powder particles. Other available methods include laser processing in which fine oil pockets are formed by irradiating spherical particles with laser while the spherical particles are rotated, micro electric-discharge machining in which fine oil pockets are formed by pressing a surface of spherical particles using a tool in the shape of a dimple, and a 3D printing method which allows spherical particles and fine oil pockets to be formed simultaneously.

Meanwhile, note that, as described above, the first contact wing portions 620 and the second contact wing portions 630 do not have an additional configuration for low-friction, unlike the surface of the main body portion 610 having a low-friction configuration. This is because the first contact wing portions 620 and the second contact wing portions 630 should be firmly fixed to the first frame P1 and the second frame P2 by being fastened using a bolt 640a and a nut 640b while surrounding both side surfaces of the first frame P1 and the second frame P2, and here, the stronger the frictional contact between the surfaces, the more stable the fixing is.

The first contact wing portions 620 face each other while being bent upward from two side end portions facing each other among four side end portions of the main body portion 610, form a U-shape together with the main body portion 610 and surround a surface of the first frame P1, and include a first bolt hole 620a for fastening the bolt 640a. Here, the first bolt hole 620a is provided as a plurality of first bolt holes 620a, and the plurality of first bolt holes 620a are arranged in a straight line in a width direction of the first contact wing portions 620.

The second contact wing portions 630 face each other while being bent downward from the remaining two side end portions, on which the first contact wing portions 620 are not formed, among the four side end portions of the main body portion 610, form a U-shape together with the main body portion 610 and surround a surface of the second frame P2, and include a second bolt hole 630a for fastening the bolt 640a. Here, the second bolt hole 630a is provided as a plurality of second bolt holes 630a, and the plurality of second bolt holes 630a are arranged in a straight line in a length direction of the second contact wing portions 630.

In this way, when the first contact wing portions 620 and the second contact wing portions 630 that form a U-shaped structure together with the main body portion 610 are provided in directions opposite from each other, the U-shaped structure may allow the first frame P1 and the second frame P2 to accurately maintain the state of crossing each other in the form of a cross in a state in which the first frame P1 and the second frame P2 are not fastened, and, because both sides, instead of one side, of the first frame P1 and the second frame P2 are supported from an initial stage, the entire process, ranging from the task of making the first frame P1 and the second frame P2 cross each other to adjust connection positions of the first frame P1 and the second frame P2 to the task of fastening using the bolt 640a and the nut 640b, may be performed very easily.

Meanwhile, the material of the bracket for cross-connecting the frames according to the third embodiment of the present invention is provided by purchasing a high-corrosion-resistance alloy steel produced by POSCO, Korea, PosMAC (product name). PosMAC is an alloy steel with a mixture of zinc, aluminum, and magnesium and is suitable for use in a humid, waterborne environment.

A method of manufacturing the bracket for cross-connecting the frames according to the third embodiment of the present invention, which is configured as described above, will be described in detail below on the basis of FIGS. 24 to 29.

Figure 24:
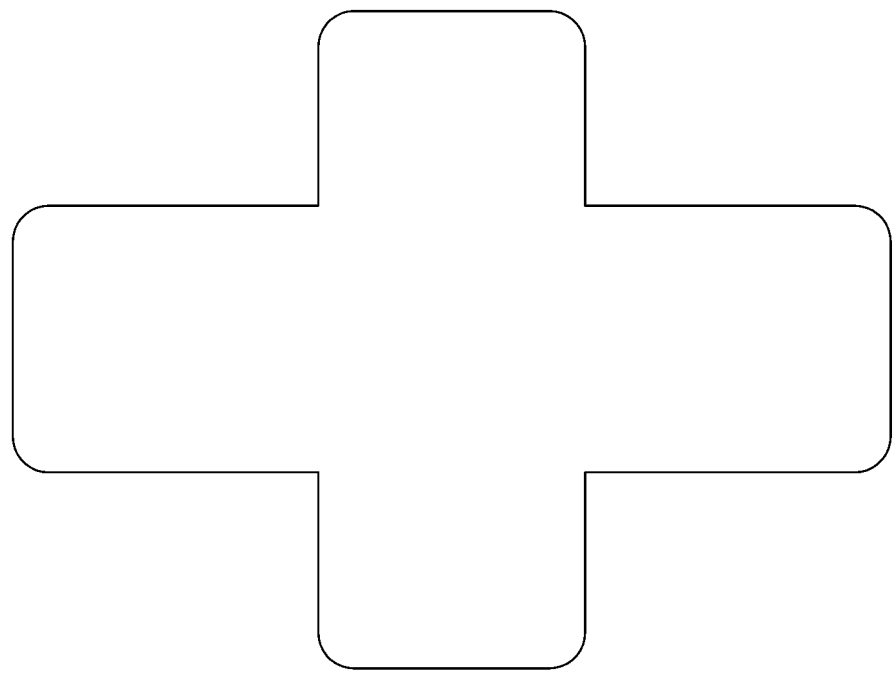
FIGS. 24 to 29 are a series of reference diagrams for describing a method of making the bracket for cross-connecting the frames according to the third embodiment of the present invention.

First, as illustrated in FIG. 24, PosMAC, which is a high-corrosion-resistance alloy steel produced by POSCO, Korea, is prepared as a material and press-cut to form a cross-shaped development view.

Figure 25:
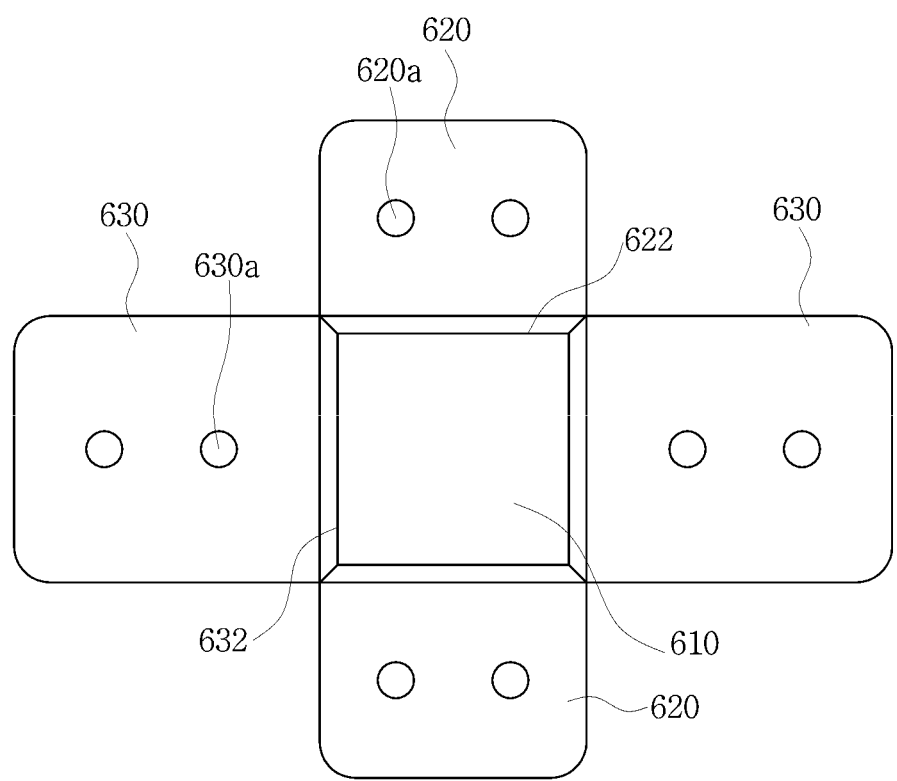

Then, a task for bending the development view is performed. As illustrated in FIG. 25, the development view is perforated to form the first bolt holes 620a and the second bolt holes 630a, and boundary lines between the main body portion 610 and the first contact wing portions 620 and boundary lines between the main body portion 610 and the second contact wing portions 630 are sliced at a small depth to form bending lines 622 and 632.

Figure 26:
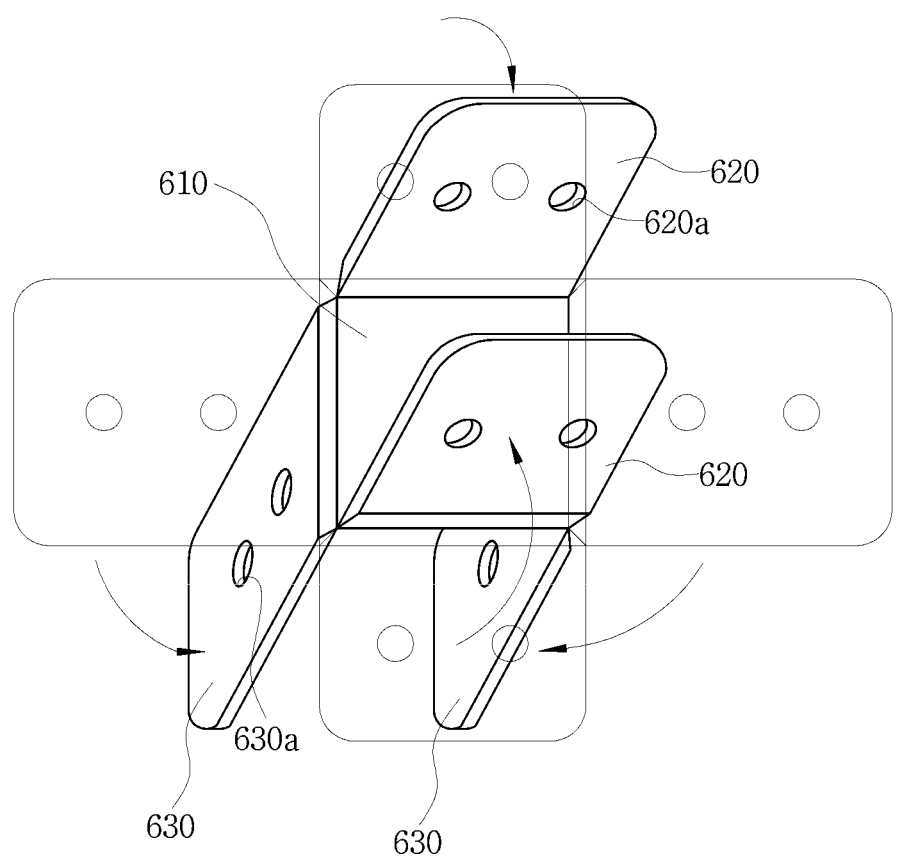
Figure 27:
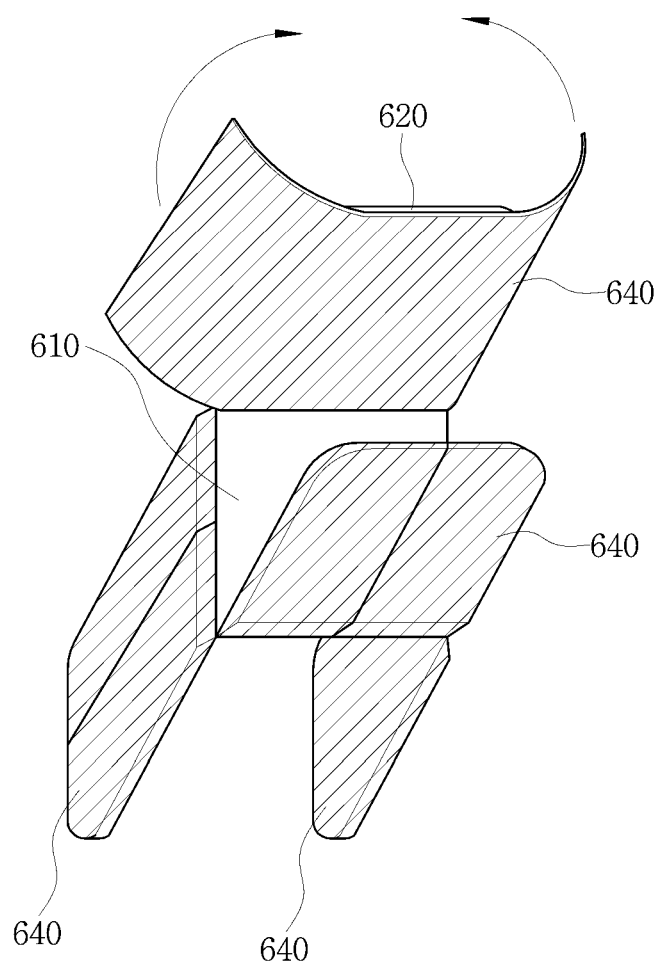

Then, as illustrated in FIG. 26, the first contact wing portions 620 are bent upward along the bending lines 622 and 632 so as to form a U-shape at an upper side together with the main body portion 610, and the second contact wing portions 630 are bent downward so as to form a U-shape at a lower side together with the main body portion 610. In this way, the overall shape of the bracket for cross-connecting the frames according to the third embodiment of the present invention is formed.

Then, a task of forming the plating layer 611, which is formed of the Ni—SiC material, on the surface of the main body portion 610 is performed. To this end, as illustrated in FIG. 23d, prior to forming the Ni—SiC plating layer 611 by electroplating, the first contact wing portions 620 and the second contact wing portions 630, which are portions except for the main body portion 610, are surrounded by a tape 640, which has insulation and waterproof functions, so that only the main body portion 610 is exposed. Then, the main body portion 610 is dipped in an electrolyte in an electrolytic bath.

Here, the above taped parent material is placed on a cathode of the electrolytic bath for forming the Ni—SiC plating layer 611, a Ti basket filled with Ni balls is placed on an anode, and the cathode and the anode are placed at a predetermined distance from each other. Also, as the electrolyte, an electrolyte which is ready-made using Ni-Sulfamate having a purity of 90% or higher is prepared.

Figure 28:
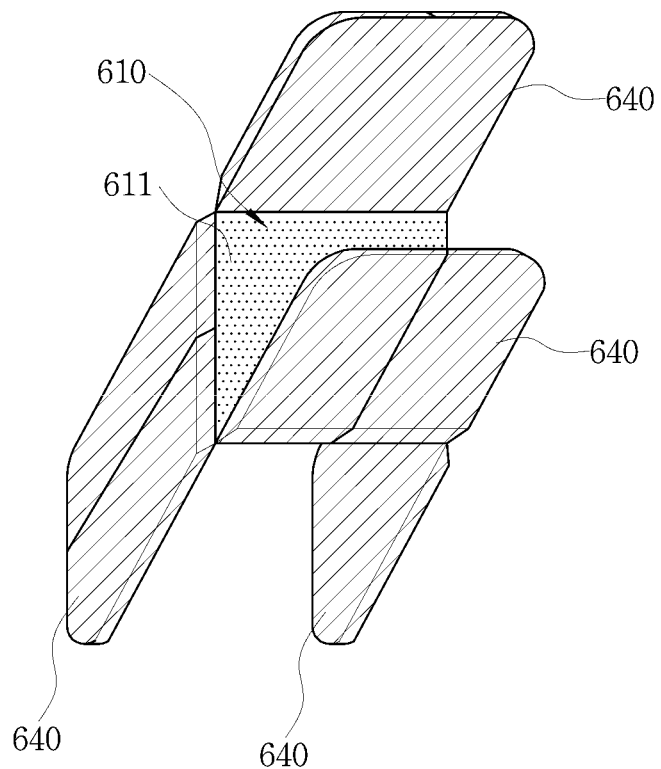
Figure 29:
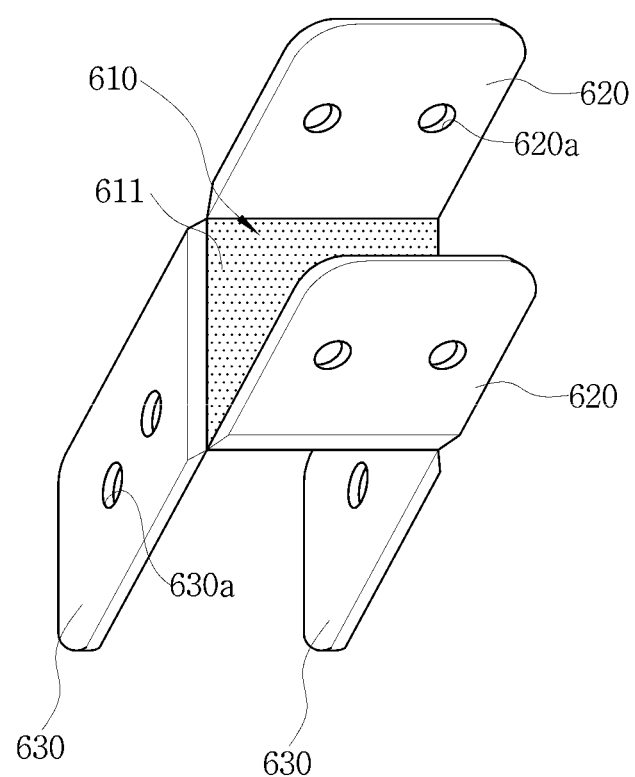

In this way, as illustrated in FIG. 28, the Ni—SiC plating layer 611 is formed only on the surface of the main body portion 610, and, in the state in which the plating layer 611 is formed, the dimples 611a are formed by irradiating the plating layer 611 with laser. This is because, only in this way, the low-friction effect due to the plurality of patterned dimples 611a may be obtained in combination with the low-friction effect due to the plating layer 611. When, conversely, the dimples 611a are temporarily formed on the surface of the main body portion 610 first, and then the plating layer 611 is formed by electroplating, because it is difficult for the electrolyte to constantly penetrate the inside of dimples 611a having a fine size which are formed first, it is difficult to uniformly plate the entire surface of the main body portion 610, and thus the low-friction effect is reduced accordingly.

When the formation of the plating layer 611 and the formation of the dimples 611a are completed as in the above process, the solid lubricating particles 612 are pressed or strongly sprayed onto the surface of the main body portion 610 using an aerosol method, thereby placing the solid lubricating particles 612 in the dimples 611a.

Then, the tape 640 surrounding the first contact wing portions 620 and the second contact wing portions 630 is removed. Then, the bracket for cross-connecting the frames according to the third embodiment of the present invention is completed.

Fourth Embodiment

Next, a floating photovoltaic system according to a fourth embodiment of the present invention will be described.

Figure 30:
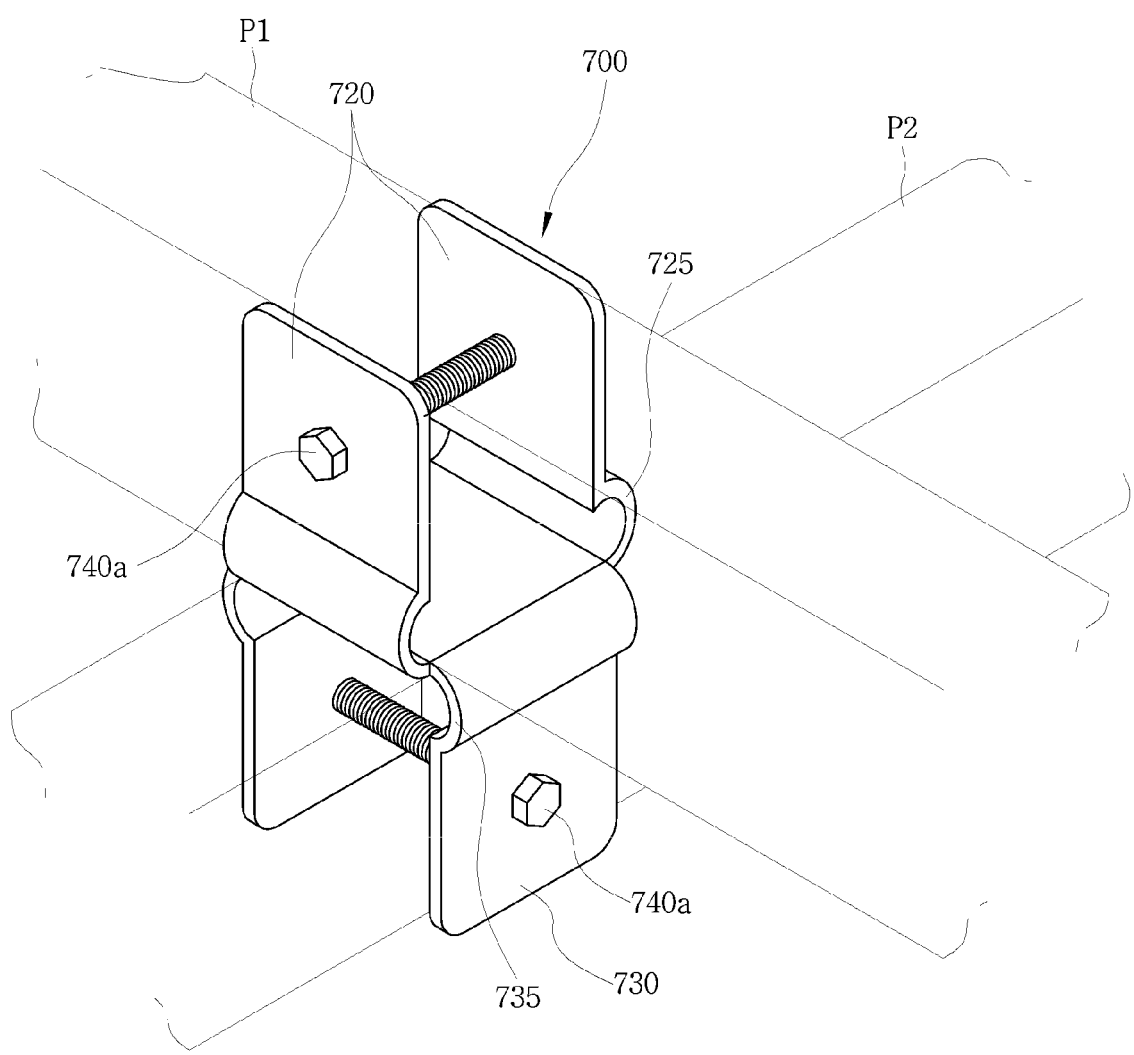
FIG. 30 is a reference perspective view showing a state in which two frames which cross each other in the form of a cross are connected by a bracket for cross-connecting frames according to a fourth embodiment of the present invention.

FIG. 30 is a reference perspective view showing a state in which two frames which cross each other in the form of a cross are connected by a bracket for cross-connecting frames according to a fourth embodiment of the present invention.

As illustrated, as in the third embodiment, a bracket 700 for cross-connecting frames according to the fourth embodiment of the present invention is also configured to simply, but stably, connect a first frame P1 and a second frame P2 which cross each other in the form of a cross in a frame assembly that supports solar panels while being supported by a float in a floating photovoltaic system.

To this end, the bracket 700 for cross-connecting the frames according to the fourth embodiment of the present invention forms a unique structure in which a U-shaped structure is applied in a complex manner so that it is able to surround and support the first frame P1 and the second frame P2 at the same time as illustrated in FIG. 30.

Further, due to a configuration including a stress distribution structure that effectively distributes stress, it is more stable under the same load condition.

Hereinafter, the bracket 700 for cross-connecting the frames according to the fourth embodiment of the present invention will be described in more detail.

Figure 31:
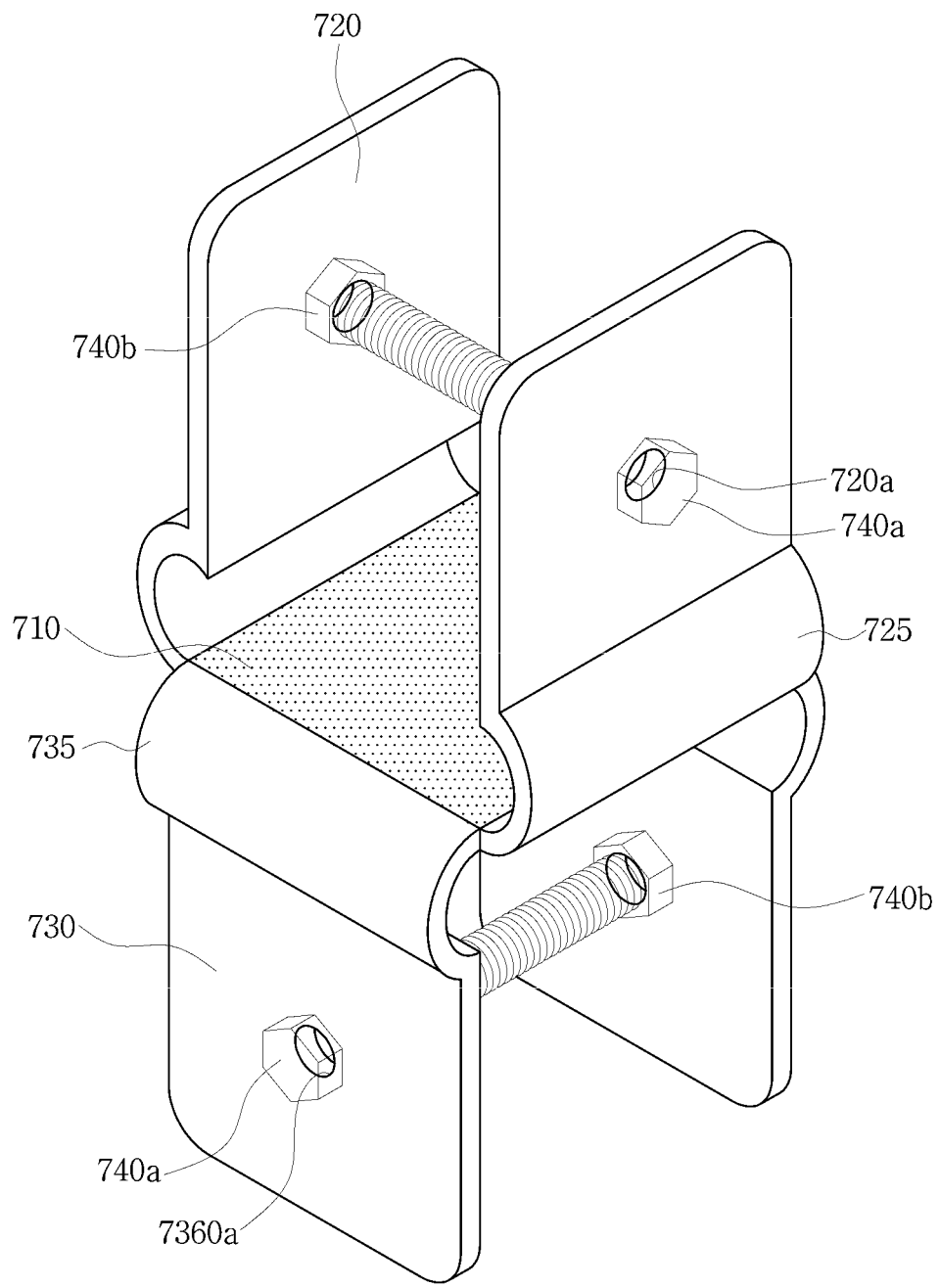
FIG. 31 is a perspective view for describing a configuration of the bracket for cross-connecting the frames according to the fourth embodiment of the present invention.
Figure 32:
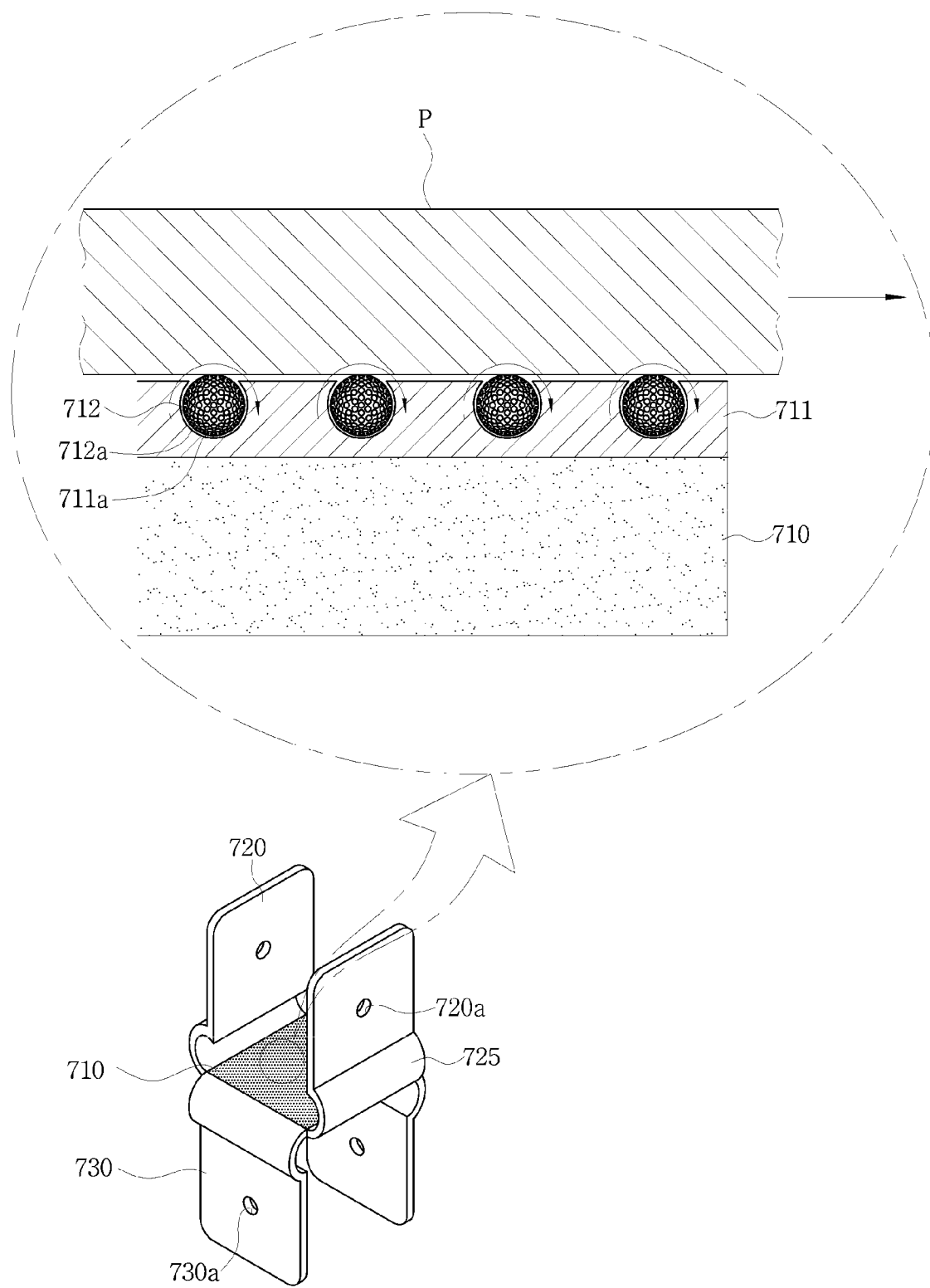
FIG. 32 is a reference diagram for describing a low-friction configuration applied to a main body portion of the bracket for cross-connecting the frames according to the fourth embodiment of the present invention.

FIG. 31 is a perspective view for describing a configuration of the bracket for cross-connecting the frames according to the fourth embodiment of the present invention, and FIG. 32 is a reference diagram for describing a low-friction configuration applied to a main body portion of the bracket for cross-connecting the frames according to the fourth embodiment of the present invention.

As illustrated, the bracket for cross-connecting the frames according to the fourth embodiment of the present invention has a form in which two U-shaped structures are formed by a main body portion 710 and a pair of first contact wing portions 720 and a pair of second contact wing portions 730 heading toward opposite directions.

The main body portion 710 is provided as a member in the shape of a quadrilateral panel whose upper surface and lower surface, which are surfaces opposing each other, come in contact with the first frame P1 and the second frame P2, respectively. The main body portion 710 comes in contact in a state in which the first frame P1 is in close contact with the upper surface and the second frame P2 is in close contact with the lower surface, which is the surface opposing the upper surface.

In the case of the main body portion 710, in the process of adjusting connection positions of the first frame P1 and the second frame P2, sliding between the first frame P1 and the second frame P2 is not smoothly performed due to friction therebetween. Thus, the position adjusting task is not smoothly performed, and it is likely that the surfaces of the first frame P1 and the second frame P2 will be damaged due to friction in the process in which sliding is performed while the first frame P1 and the second frame P2 are in contact with each other. Accordingly, in order to minimize surface friction therebetween, as illustrated in the enlarged portion of FIG. 32, a unique configuration, in which a plurality of dimples 711a are formed on a surface of the main body portion 710 and solid lubricating particles 712 configured to roll in place while being accommodated in the dimples 711a so as to serve as bearings are further included, is additionally provided.

Such a configuration is, as in the third embodiment, implemented by adopting a low-friction member using the dimples 711a that is applied to a vehicle engine, in consideration of the fact that sliding of the first frame P1 and the second frame P2 in a straight line for adjusting the positions thereof while the first frame P1 and the second frame P2 are in contact with the main body portion 710 is somewhat similar to the relationship between a piston and an inner wall of a cylinder in the vehicle engine that continuously rub against each other while the piston reciprocates in a straight line and rotates (refer to Korean Patent Registration No. 1507012 (Mar. 24, 2015)). However, by further development from here, a unique configuration in which the solid lubricating particles 712 are added to the dimples 711a so as to serve as bearings has been added.

According to such a configuration, a low-friction effect due to the plurality of dimples 711a at the time of surface contact with the main body portion 710 that is caused by movement of the first frame P1 and the second frame P2 and a low-friction effect due to the solid lubricating particles 712 that serve as bearings while rolling in place act in combination such that an excellent low-friction effect is achieved. Here, a plating layer 711 formed of a Ni-SiC material may be formed first on the surface of the main body portion 710, and then the dimples 711a may be formed on the plating layer 711. In this way, in addition to the low-friction effect of the solid lubricating particles 712, a higher level of low-friction effect can be expected.

According to the configuration in which the solid lubricating particles 712, which have a spherical shape, are accommodated in the dimples 711a, in an environment illustrated in FIG. 32 in which the main body portion 710 strongly slides and causes frictional contact due to movement of the first frame P1 and the second frame P2, the rolling movement of the solid lubricating particles 712 and the action of minimizing the contact area may minimize wear and friction of the plating layer 711. Further, according to materials constituting the solid lubricating particles 712, in the environment in which the main body portion 710 slides and causes frictional contact, fragment particles generated as the solid lubricating particles 712 gradually wear out may be mixed with a liquid lubricating agent and perform additional lubrication.

Here, as in the third embodiment, the solid lubricating particles 712 may be manufactured to be suitable for an environment in which the present invention is practiced. Alternatively, the solid lubricating particles 712 may be provided by purchasing ready-made ones. For example, IF-$WS_2$ nanoparticles, synthesized by Weizmann Institute of Science in the early 1990s, began to be commercially produced in 2002. Unlike $MOS_2$ nanoparticles which are in the form of platelets, the IF-$WS_2$ particles are in a spherical shape with a diameter of about 3 to 350 nm. The IF-$WS_2$ particles seem to be able to be provided in micro units suitable for being accommodated in the dimples 711a. The IF-$WS_2$ particles are generally known to cause rolling friction between rough surfaces of metal, and thus are expected to be able to cause rolling friction also in a state of being accommodated in the dimples 711a as in the fourth embodiment.

For reference, the spherical solid lubricating particles 712 may be provided in various ways using only the current technology. First, in order to provide the spherical particles, various methods may be used, such as a spray drying method, a mold forming method, a method using surface tension, in which, by flowing a melt or slurry on a surface with nano-protrusions, spherical bodies are formed using surface tension and spherical particles are provided through a subsequent process of cooling and drying, a method using the Lotus effect, and a molding method using a 3D printer.

Also, a plurality of fine oil pockets 712a for accommodating a liquid lubricating agent are formed on a surface of the solid lubricating particles 712 as if on a surface of a golf ball. The forming of the fine oil pockets 712a on the surface of the solid lubricating particles 712 may be performed using various methods. Among the methods, a spray drying method and a powder mold forming method are performed in an order in which fine powder particles smaller than the solid lubricating particles 712 are coagulated on the surface of the spherical particles, which are formed in advance, and then heat-treated. In this way, as illustrated in FIG. 23 relating to the third embodiment, fine oil pockets are naturally formed between the coagulated fine powder particles. Other available methods include laser processing in which fine oil pockets are formed by irradiating spherical particles with laser while the spherical particles are rotated, micro electric-discharge machining in which fine oil pockets are formed by pressing a surface of spherical particles using a tool in the shape of a dimple, and a 3D printing method which allows spherical particles and fine oil pockets to be formed simultaneously.

Meanwhile, note that, as described above, the first contact wing portions 720 and the second contact wing portions 730 do not have an additional configuration for low-friction, unlike the surface of the main body portion 710 having a low-friction configuration. This is because the first contact wing portions 720 and the second contact wing portions 730 should be firmly fixed to the first frame P1 and the second frame P2 by being fastened using a bolt 740a and a nut 740b while surrounding both side surfaces of the first frame P1 and the second frame P2, and here, the stronger the frictional contact between the surfaces, the more stable the fixing is.

The first contact wing portions 720 face each other while being bent upward from two side end portions facing each other among four side end portions of the main body portion 710, form a U-shape together with the main body portion 710 and surround a surface of the first frame P1, and include a first bolt hole 720a for fastening the bolt 740a.

The second contact wing portions 730 face each other while being bent downward from the remaining two side end portions, on which the first contact wing portions 720 are not formed, among the four side end portions of the main body portion 710, form a U-shape together with the main body portion 710 and surround a surface of the second frame P2, and include a second bolt hole 730a for fastening the bolt 740a.

In this way, when the first contact wing portions 720 and the second contact wing portions 730 that form a U-shaped structure together with the main body portion 710 are provided in directions opposite from each other, the U-shaped structure may allow the first frame P1 and the second frame P2 to accurately maintain the state of crossing each other in the form of a cross in a state in which the first frame P1 and the second frame P2 are not fastened, and, because both sides, instead of one side, of the first frame P1 and the second frame P2 are supported from an initial stage, the entire process, ranging from the task of making the first frame P1 and the second frame P2 cross each other to adjust connection positions of the first frame P1 and the second frame P2 to the task of fastening using the bolt 740a and the nut 740b, may be performed very easily.

Further, a first stress distribution part 725 and a second stress distribution part 735, each of which is formed of a curved surface having a semicircular cross-section, are formed at the first contact wing portion 720 and the second contact wing portion 730, respectively, to effectively distribute stress. The first stress distribution part 725 is formed at a predetermined portion of the first contact wing portion that is connected to the main body portion 710, and the second stress distribution part 735 is formed at a predetermined portion of the second contact wing portion 730 that is connected to the main body portion 710.

In this way, when the first stress distribution part 725 and the second stress distribution part 735 are formed at the first contact wing portion 720 and the second contact wing portion 730, respectively, the maximum stress concentrated is significantly reduced under the same load condition.

Meanwhile, the material of the bracket for cross-connecting the frames according to the fourth embodiment of the present invention is provided by purchasing a high-corrosion-resistance alloy steel produced by POSCO, Korea, PosMAC (product name). PosMAC is an alloy steel with a mixture of zinc, aluminum, and magnesium and is suitable for use in a humid, waterborne environment.

A method of manufacturing the bracket for cross-connecting the frames according to the fourth embodiment of the present invention, which is configured as described above, will be described in detail below on the basis of FIGS. 33 to 38.

Figure 33:
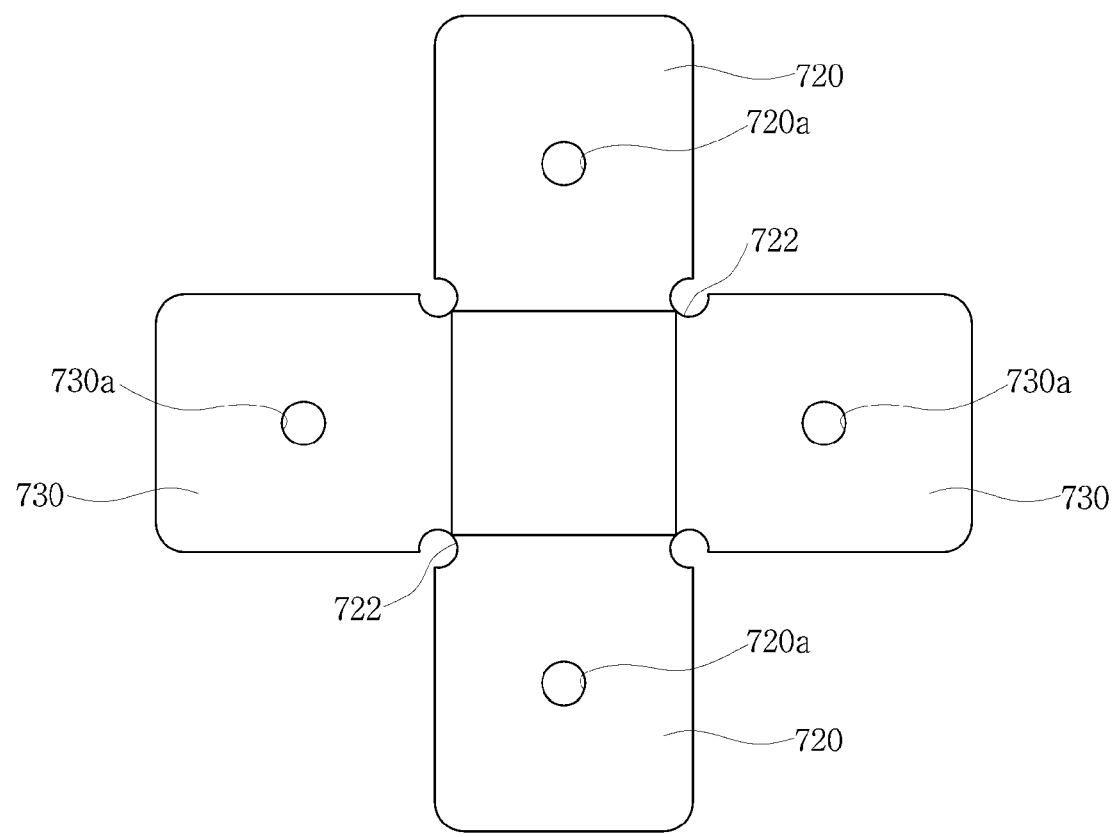
FIGS. 33 to 38 are a series of reference diagrams for describing a method of making the bracket for cross-connecting the frames according to the fourth embodiment of the present invention.

First, as illustrated in FIG. 33, PosMAC, which is a high-corrosion-resistance alloy steel produced by POSCO, Korea, is prepared as a material and press-cut to form a cross-shaped development view. Here, the main body portion 710, the first contact wing portions 720, and the second contact wing portions 730 are already formed, and the first bolt hole 720a and the second bolt hole 720b are also formed together. Also, in order to facilitate the future bending task, a chamfered portion 722 is formed at a corner portion where the first contact wing portion 720 and the second contact wing portion 730 meet. In addition, boundary lines between the main body portion 710 and the first contact wing portions 720 and boundary lines between the main body portion 710 and the second contact wing portions 730 are sliced at a small depth to form bending lines.

Figure 34:
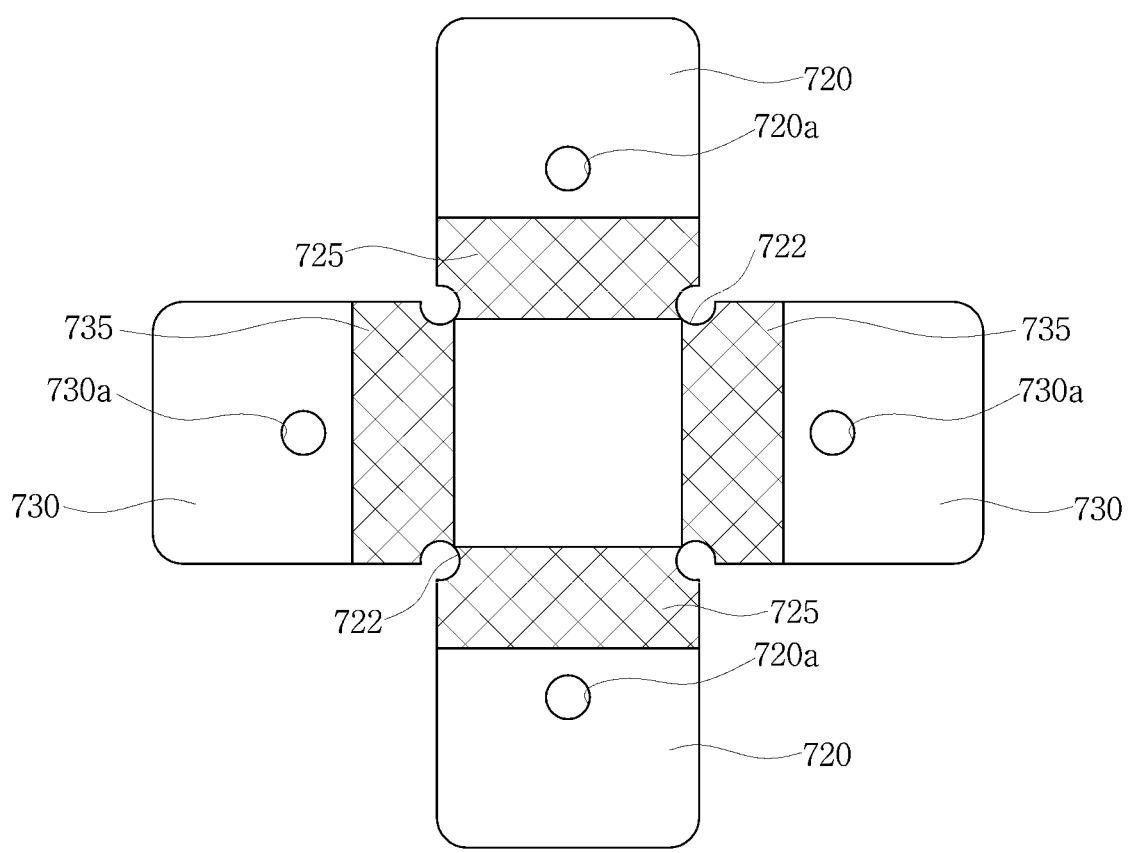

Then, a task for bending the development view is performed. As illustrated in FIG. 34, predetermined portions of the first contact wing portion 720 and the second contact wing portion 730 that meet the main body portion 710 are pressed to form the first stress distribution part 725 and the second stress distribution part 735, each of which has a semicircular cross-section.

Figure 35:
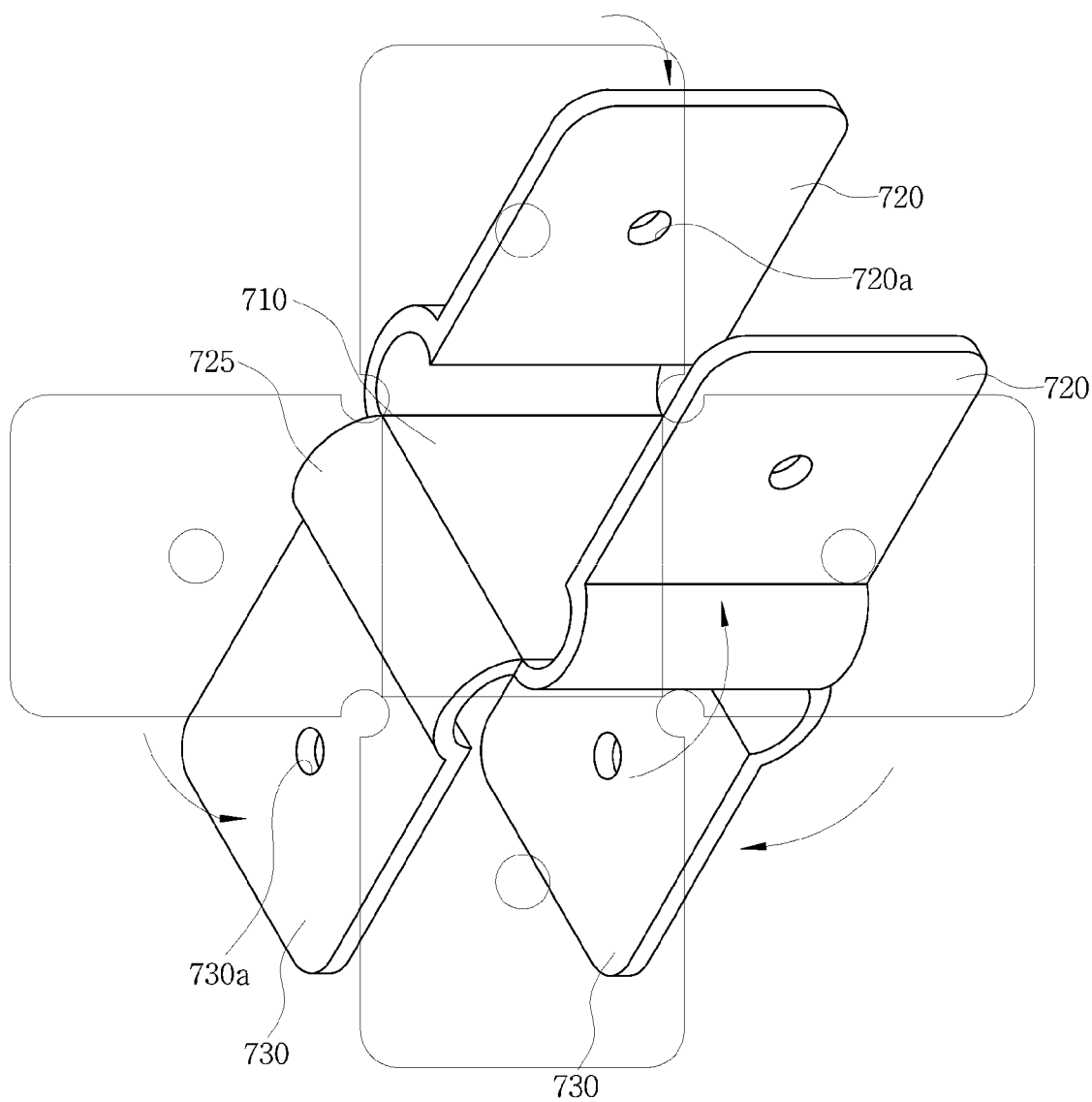
Figure 36:
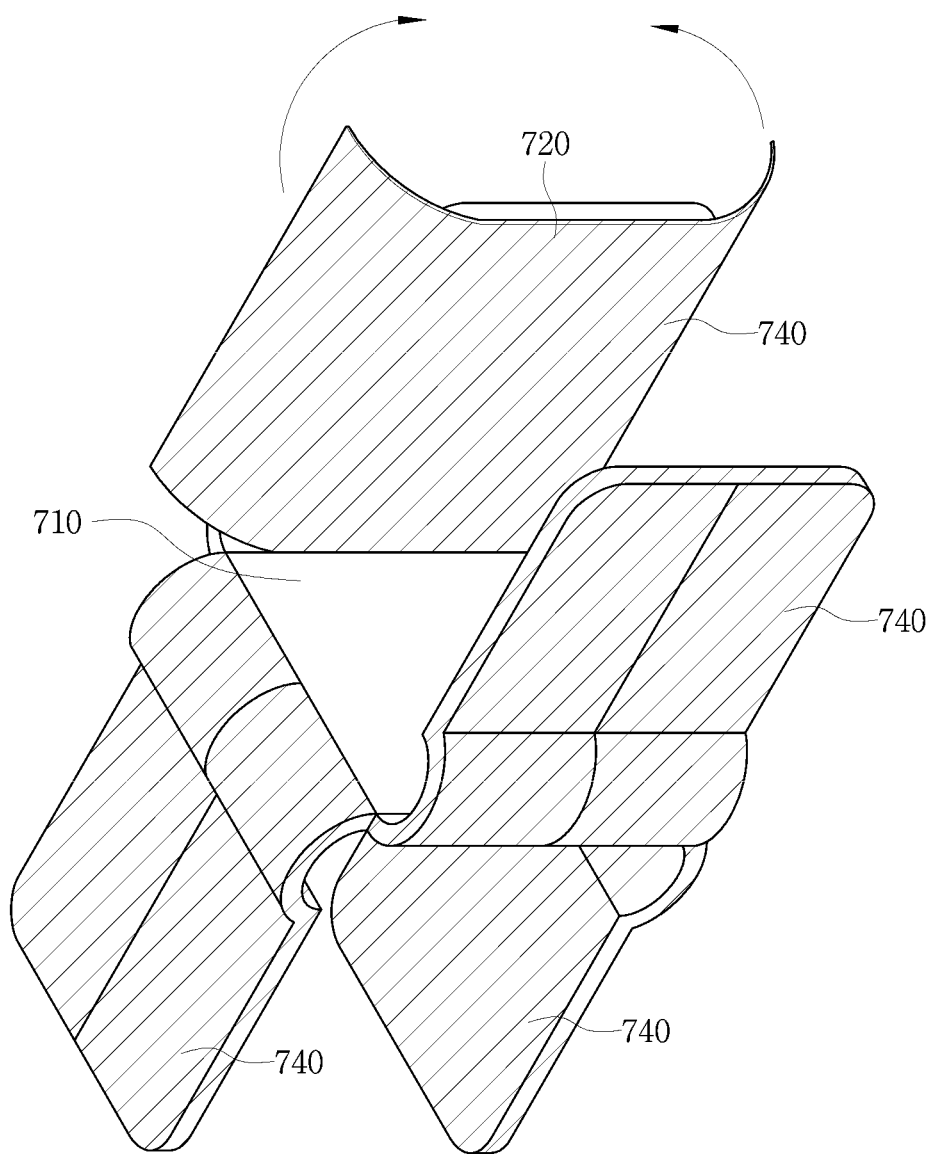

Then, as illustrated in FIG. 35, the first contact wing portions 720 are bent upward along the bending lines so as to form a U-shape at an upper side together with the main body portion 710, and the second contact wing portions 730 are bent downward so as to form a U-shape at a lower side together with the main body portion 710. In this way, the overall shape of the bracket for cross-connecting the frames according to the fourth embodiment of the present invention is formed.

Then, a task of forming the plating layer 711, which is formed of the Ni-SiC material, on the surface of the main body portion 710 is performed. To this end, as illustrated in FIG. 6d, prior to forming the Ni-SiC plating layer 711 by electroplating, the first contact wing portions 720 and the second contact wing portions 730, which are portions except for the main body portion 710, are surrounded by a tape 740, which has insulation and waterproof functions, so that only the main body portion 710 is exposed. Then, the main body portion 710 is dipped in an electrolyte in an electrolytic bath.

Here, the above taped parent material is placed on a cathode of the electrolytic bath for forming the Ni—SiC plating layer 711, a Ti basket filled with Ni balls is placed on an anode, and the cathode and the anode are placed at a predetermined distance from each other. Also, as the electrolyte, an electrolyte which is ready-made using Ni-Sulfamate having a purity of 90% or higher is prepared.

Figure 37:
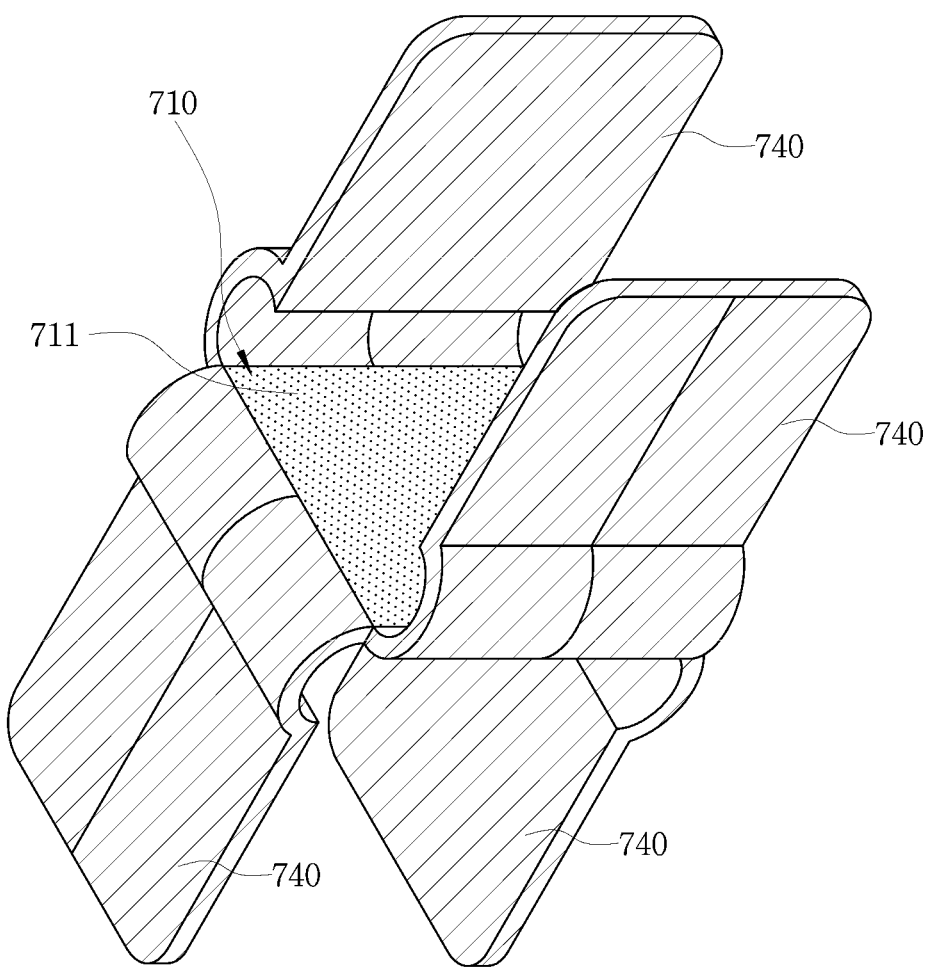
Figure 38:
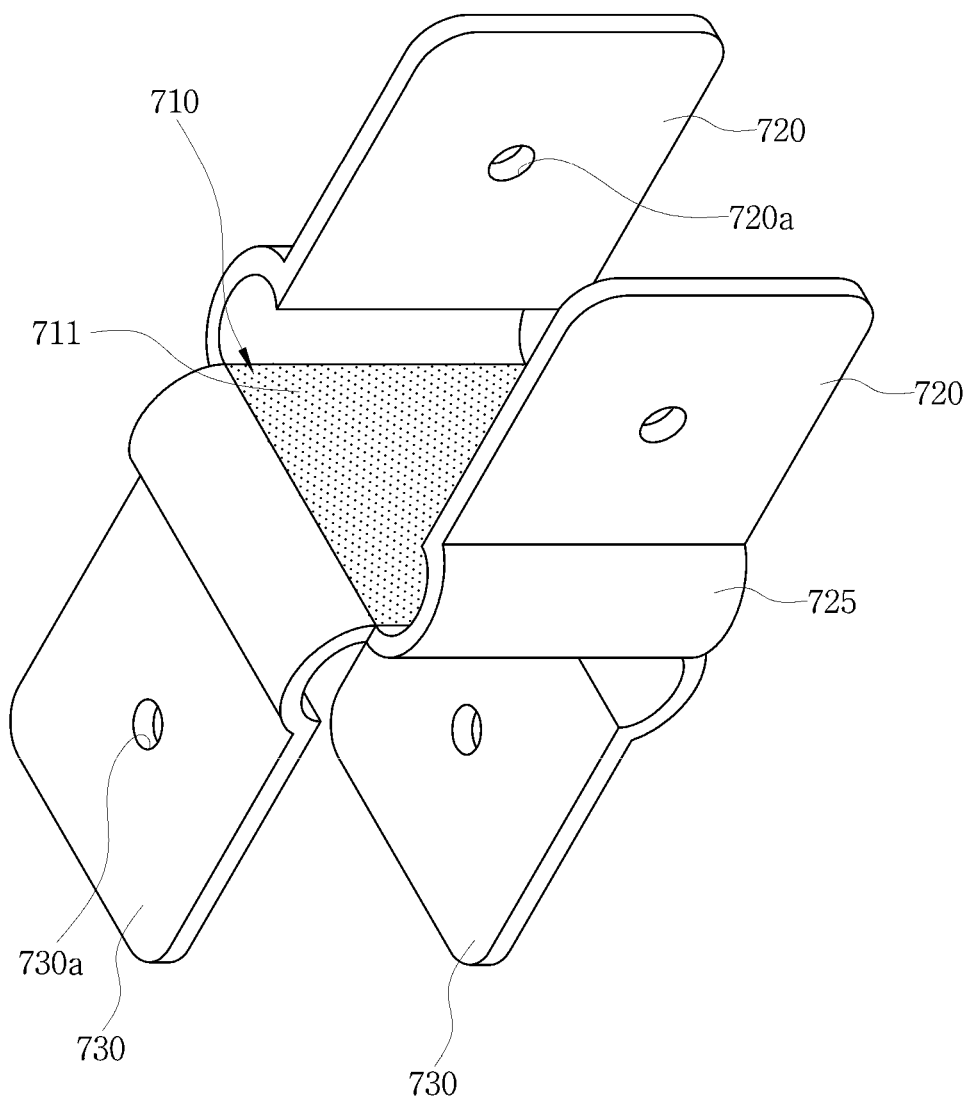

In this way, as illustrated in FIG. 37, the Ni—SiC plating layer 711 is formed only on the surface of the main body portion 710, and, in the state in which the plating layer 711 is formed, the dimples 711a are formed by irradiating the plating layer 711 with laser. This is because, only in this way, the low-friction effect due to the plurality of patterned dimples 711a may be obtained in combination with the low-friction effect due to the plating layer 711. When, conversely, the dimples 711a are temporarily formed on the surface of the main body portion 710 first, and then the plating layer 711 is formed by electroplating, because it is difficult for the electrolyte to constantly penetrate the inside of dimples 711a having a fine size which are formed first, it is difficult to uniformly plate the entire surface of the main body portion 710, and thus the low-friction effect is reduced accordingly.

When the formation of the plating layer 711 and the formation of the dimples 711a are completed as in the above process, the solid lubricating particles 712 are pressed or strongly sprayed onto the surface of the main body portion 710 using an aerosol method, thereby placing the solid lubricating particles 712 in the dimples 711a.

Then, the tape 740 surrounding the first contact wing portions 720 and the second contact wing portions 730 is removed. Then, the bracket for cross-connecting the frames according to the fourth embodiment of the present invention is completed.

Fifth Embodiment

Next, a configuration of a bracket for cross-connecting frames according to a fifth embodiment of the present invention will be described.

Figure 39:
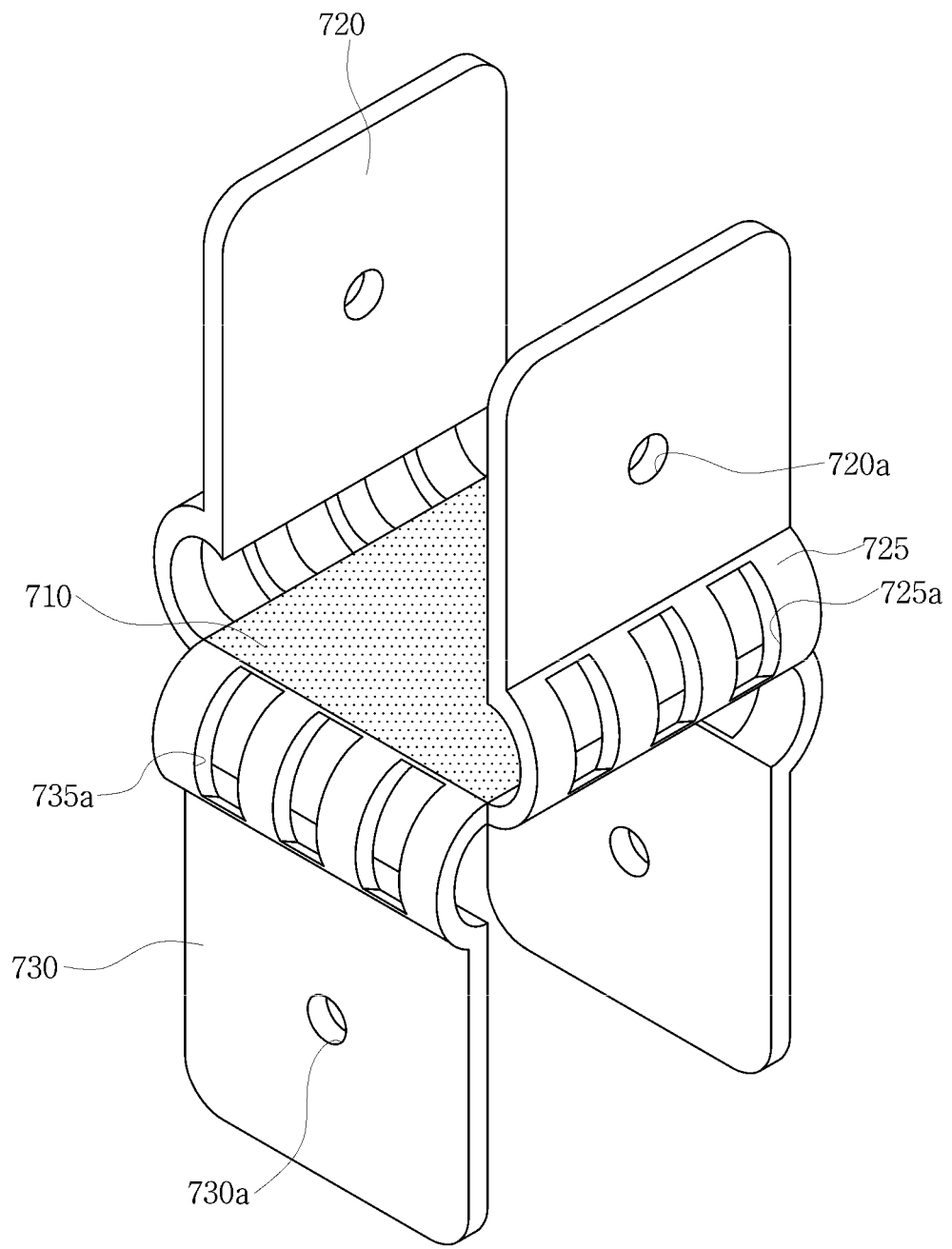
FIG. 39 is a perspective view for describing a configuration of a bracket for cross-connecting frames according to a fifth embodiment of the present invention.

FIG. 39 is a perspective view for describing the configuration of the bracket for cross-connecting the frames according to the fifth embodiment of the present invention.

As illustrated, in the bracket for cross-connecting the frames according to the fifth embodiment of the present invention, a plurality of cut-out portions 725a and 735a are formed in a first stress distribution part 725 and a second stress distribution part 735, respectively. According to such a configuration, when applied load is at a predetermined level or lower, the first stress distribution part 725 and the second stress distribution part 735 serve to distribute stress so that stress is not concentrated, but, when excessive load is applied and thus the load exceeds a predetermined level, the first stress distribution part 725 and the second stress distribution part 735 are deformed before other portions and serve as dampers that protect the other portions. In this way, in addition to being possible to deal with a wide range of various applied loads, it is possible to accurately predict a portion that will be deformed in the entire bracket for cross-connecting the frames. Thus, there is an advantage in that designing to deal with various loads is significantly facilitated.

The invention claimed is:

1. A rotary bracket for connecting individual units of a floating photovoltaic system, which is formed of a plurality of solar panels, a profile assembly configured to support the plurality of solar panels to be placed above a surface of water, and a set of individual units each of which has a float combined therewith,
   wherein, in the floating photovoltaic system, the rotary bracket connects a one-side profile and an other-side profile in a longitudinal direction, the one-side profile and the other-side profile belonging to a profile assembly of one-side individual units and a profile assembly of other-side individual units, respectively, which are disposed at one side and the other side and neighbor each other, the rotary bracket includes a first coupling member coupled to an end portion of the one-side profile and a second coupling member coupled to an end portion of the other-side profile, and the first coupling member and the second coupling member are coupled to be vertically bendable relative to each other so that the rotary bracket is able to accommodate a vertical step difference and a rotational displacement of the one-side individual unit relative to the other-side individual unit,
   wherein the first coupling member includes a c-shaped first end portion coupling part coupled in a state of being in contact from an upper surface to a lower surface of the end portion of the one-side profile and a pair of first cross-coupling parts configured to extend from the first end portion coupling part toward the other side and face each other in a state of being disposed at a left side and a right side and spaced apart from each other,
   wherein the second coupling member includes a c-shaped second end portion coupling part coupled in a state of being in contact from an upper surface to a lower surface of the end portion of the other-side profile and a pair of second cross-coupling parts configured to extend from the second end portion coupling part toward the one side, configured to face each other in a state of being disposed at the left side and the right side and spaced apart from each other, and coupled to be rotatable in the vertical direction in a state of crossing the pair of first cross-coupling parts, and
   wherein the first coupling member and the second coupling member are made from two metal plate materials cut in the shape of a cross to include a central portion, a pair of first wing portions symmetrical to each other about the central portion, and a pair of second wing portions symmetrical to each other about the central portion and orthogonal to the first wing portions, wherein, regarding each metal plate material, the c-shaped first end portion coupling part and the c-shaped second end portion coupling part, which are formed of the central portion and the first wing portions, are formed by the first wing portions being bent in one direction about the central portion, and the pair of first cross-coupling parts and the pair of second cross-coupling parts are formed so as to face each other in a state of being bent in an opposite direction from the first wing portions about the central portion.

2. A rotary bracket for connecting individual units of a floating photovoltaic system, which is formed of a plurality of solar panels, a profile assembly configured to support the plurality of solar panels to be placed above a surface of water, and a set of individual units each of which has a float combined therewith,
   wherein, in the floating photovoltaic system, the rotary bracket connects a one-side profile and an other-side profile in a longitudinal direction, the one-side profile and the other-side profile belonging to a profile assembly of one-side individual units and a profile assembly of other-side individual units, respectively, which are disposed at one side and the other side and neighbor each other, the rotary bracket includes a first coupling member coupled to an end portion of the one-side profile and a second coupling member coupled to an end portion of the other-side profile, and the first coupling member and the second coupling member are coupled to be vertically bendable relative to each other so that the rotary bracket is able to accommodate a vertical step difference and a rotational displacement of the one-side individual unit relative to the other-side individual unit,
   wherein the first coupling member includes a c-shaped first end portion coupling part coupled in a state of being in contact from an upper surface to a lower surface of the end portion of the one-side profile and a pair of first cross-coupling parts configured to extend from the first end portion coupling part toward the other side and face each other in a state of being disposed at a left side and a right side and spaced apart from each other,
   wherein the second coupling member includes a c-shaped second end portion coupling part coupled in a state of being in contact from an upper surface to a lower surface of the end portion of the other-side profile and a pair of second cross-coupling parts configured to extend from the second end portion coupling part toward the one side, configured to face each other in a state of being disposed at the left side and the right side and spaced apart from each other, and coupled to be rotatable in the vertical direction in a state of crossing the pair of first cross-coupling parts,
   wherein the second coupling member is coupled by a single bolt that vertically passes through the second coupling member and the end portion of the other-side profile so that the second coupling member is rotatable in a horizontal direction about the end portion of the other-side profile, and
   wherein the second coupling member is coupled to the end portion of the other-side profile with a clearance formed therebetween so that the second coupling member is rotatable in the horizontal direction about the end portion of the other-side profile.

3. A floating photovoltaic system formed of a plurality of solar panels, a profile assembly configured to support the plurality of solar panels to be placed above a surface of water, and a set of individual units each of which has a float combined therewith,
   wherein, for connection between the individual units, the floating photovoltaic system includes the rotary bracket of claim 1.

4. A floating photovoltaic system formed of a plurality of solar panels, a profile assembly configured to support the plurality of solar panels to be placed above a surface of water, and a set of individual units each of which has a float combined therewith, wherein, for connection between the individual units, the floating photovoltaic system includes a rotary bracket, wherein, in the floating photovoltaic system, the rotary bracket connects a one-side profile and an other-side profile in a longitudinal direction, the one-side profile and the other-side profile belonging to a profile assembly of one-side individual units and a profile assembly of other-side individual units, respectively, which are disposed at one side and the other side and neighbor each other, the rotary bracket includes a first coupling member coupled to an end portion of the one-side profile and a second coupling member coupled to an end portion of the other-side profile, and the first coupling member and the second coupling member are coupled to be vertically bendable relative to each other so that the rotary bracket is able to accommodate a vertical step difference and a rotational displacement of the one-side individual unit relative to the other-side individual unit, wherein the float is formed of a main body having a sealed empty space formed therein by separately forming two half main bodies by injection molding so that each half main body is in the shape of a container having a bottom panel and an outer wall, placing one of the two half main bodies above the other one in a state in which the one of the two half main bodies is flipped upside down, and then binding the two half main bodies in a state in which the two half main bodies face each other, wherein a welding part formed along an upper end portion of the outer wall of the half main body includes multiple heat welding lines formed in layers outward from an inner side of an end portion of the outer wall so that heat welding is performed in multiple layers, wherein, in the empty space inside the main body that is formed due to binding between the half main bodies, a horizontal partition and a vertical partition are formed to reinforce strength while crossing each other and forming multiple rooms, and wherein the outer wall of the half main body is formed of a perpendicular portion formed to be perpendicular along a circumferential portion of the bottom panel and an inclined portion formed to be inclined from the perpendicular portion in a direction in which an outer side of the inclined portion gradually widens upward, so that the outer wall of the half main body has a shape that gradually protrudes toward the welding part where the outer walls of the half main bodies meet.

5. The floating photovoltaic system of claim 4, wherein, at a lower end portion of the perpendicular portion of the outer wall, a reinforcing protrusion formed to protrude outward along a circumference of the perpendicular portion is formed with a thickness that is eight times or larger than a thickness of the bottom panel.

6. The floating photovoltaic system of claim 4, wherein:

a plurality of ribs for reinforcement of strength are formed in the shape of a checkerboard scale on the bottom panel so as to be orthogonal to each other, and ribs for reinforcement of strength are also formed on the horizontal partition and the vertical partition so as to be connected to the ribs formed on the bottom panel; and brackets are formed on an inner side surface of the outer wall so as to be connected to the ribs formed on the bottom panel.

7. The floating photovoltaic system of claim 4, wherein:

in the float, a through-tube configured to perpendicularly pass through the main body is formed at every point where the horizontal partition and the vertical partition cross each other;

insulating supporters are installed at the same height in inner holes of two through-tubes among the through-tubes, the float includes a first electrode rod fixed to one of the insulating supporters and installed in a form in which a lower end portion extends to the vicinity of a lower end portion of the through-tube and a second electrode rod which is fixed to the other one of the insulating supporters, has a smaller length than the first electrode rod, and has a lower end portion only extending to a portion slightly below an upper portion of the through-tube;

the float further includes a comparator configured to receive and compare capacitance values due to the first electrode rod, the second electrode rod, and water introduced into the inner holes of the through-tubes, and a signal output part configured to receive a signal of the comparator and transmit a signal, which indicates which of the first electrode rod and the second electrode rod has come in contact with water, to the outside so that a risk of flooding of a facility installed at an upper portion of the float is determined.

8. The floating photovoltaic system of claim 4, further comprising a conductive grounding member which is installed in the main body and has an upper end portion connected to a portion of a waterborne structure above a surface of water and a lower end portion submerged in water and configured to connect the waterborne structure to the surface of water, thus being able to perform a grounding function, wherein the grounding member is installed on at least one outer side surface of outer side surfaces of the main body and installed from the upper end portion of the main body to the lower end portion thereof in a form coming in close contact along the shape of the outer side surface of the main body.

9. The floating photovoltaic system of claim 3, wherein:

the first coupling member includes a c-shaped first end portion coupling part coupled in a state of being in contact from an upper surface to a lower surface of the end portion of the one-side profile and a pair of first cross-coupling parts configured to extend from the first end portion coupling part toward the other side and face each other in a state of being disposed at a left side and a right side and spaced apart from each other; and the second coupling member includes a c-shaped second end portion coupling part coupled in a state of being in contact from an upper surface to a lower surface of the end portion of the other-side profile and a pair of second cross-coupling parts configured to extend from the second end portion coupling part toward the one side, configured to face each other in a state of being disposed at the left side and the right side and spaced apart from each other, and coupled to be rotatable in the vertical direction in a state of crossing the pair of first cross-coupling parts.

10. The floating photovoltaic system of claim 9, wherein the first coupling member and the second coupling member are made from two metal plate materials cut in the shape of a cross to include a central portion, a pair of first wing portions symmetrical to each other about the central portion, and a pair of second wing portions symmetrical to each other about the central portion and orthogonal to the first wing portions, wherein, regarding each metal plate material, the c-shaped first end portion coupling part and the c-shaped second end portion coupling part, which are formed of the central portion and the first wing portions, are formed by the first wing portions being bent in one direction about the central portion, and the pair of first cross-coupling parts and the pair of second cross-coupling parts are formed so as to face each other in a state of being bent in an opposite direction from the first wing portions about the central portion.

11. The floating photovoltaic system of claim 9, wherein:
the second coupling member is coupled by a single bolt that vertically passes through the second coupling member and the end portion of the other-side profile so that the second coupling member is rotatable in a horizontal direction about the end portion of the other-side profile; and
the second coupling member is coupled to the end portion of the other-side profile with a clearance formed therebetween so that the second coupling member is rotatable in the horizontal direction about the end portion of the other-side profile.

\* \* \* \* \*